US012717125B1

(12) United States Patent
Gupta et al.

(10) Patent No.: US 12,717,125 B1
(45) Date of Patent: Aug. 25, 2026

(54) APPARATUS AND METHOD FOR INLINE DETECTION AND MODIFICATION OF SUBOPTIMAL SCAN VIEWS OF A PLURALITY OF CONSECUTIVE IMAGES

(71) Applicant: Pramana, Inc., Cambridge, MA (US)

(72) Inventors: Raghubansh Bahadur Gupta, Bangalore (IN); Rohan Prateek, Uttar Pradesh (IN); Sanku Bhanu Prakash, Bangalore (IN); Sai Pranav Varada Raghunath, Bengaluru (IN); Prasanth Perugupalli, Cary, NC (US)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 19/321,858

(22) Filed: Sep. 8, 2025

(51) Int. Cl.
*G02B 21/00* (2006.01)
*G02B 21/36* (2006.01)
*G06T 7/00* (2017.01)

(52) U.S. Cl.
CPC ......... *G02B 21/006* (2013.01); *G02B 21/367* (2013.01); *G06T 7/0016* (2013.01); *G06T 2207/10016* (2013.01); *G06T 2207/20081* (2013.01)

(58) Field of Classification Search
CPC .... G02B 21/006; G02B 21/367; G02B 21/00; G02B 21/0004; G02B 21/0052; G02B 21/008; G02B 21/36; G02B 21/361; G02B 21/365; G06T 7/016; G06T 2207/10016; G06T 2207/20081; G06T 5/60; G06T 7/0012; G06T 2207/10056; G06N 20/00
USPC ............... 359/383, 362, 363, 368, 369, 382; 250/201.2, 201.3, 201.4, 201.6, 201.7, 250/201.8; 382/128, 155, 156, 157, 159, 382/254, 255; 706/12
See application file for complete search history.

(56) References Cited

U.S. PATENT DOCUMENTS

| | | | | |
|---|---|---|---|---|
| 2006/0098861 | A1 | 5/2006 | Pitter et al. | |
| 2010/0074489 | A1 * | 3/2010 | Bacus | G06T 3/40 382/128 |
| 2011/0102571 | A1 * | 5/2011 | Yoneyama | G02B 21/367 359/368 |
| 2017/0323431 | A1 * | 11/2017 | Sarkar | G06T 7/0014 |
| 2021/0149170 | A1 * | 5/2021 | Leshem | G02B 21/006 |
| 2025/0132018 | A1 | 4/2025 | Gangirevula et al. | |

FOREIGN PATENT DOCUMENTS

WO 2024233636 A1 11/2024

* cited by examiner

*Primary Examiner* — Arnel C Lavarias
(74) *Attorney, Agent, or Firm* — CALDWELL LLC

(57) ABSTRACT

An apparatus and method for inline detection and modification of suboptimal scan views of a plurality of consecutive images. The apparatus includes at least a processor and a memory communicatively connected to the at least a processor. The memory instructs the processor to receive the plurality of consecutive images from at least an imaging device, wherein each consecutive image of the plurality of consecutive images is associated with at least an image metric, detect a first consecutive image and a second consecutive image that are out of specification, wherein the second consecutive image is suboptimal, modify the one or more metrics as a function of the probed focal plane, and initiate a rescanning operation of the second consecutive image as a function of the probed focal plane.

20 Claims, 15 Drawing Sheets

500

Reference Z and Stack Range Estimation for best location

Z Level Classification

Acquired Stack

Higher Z level

Similar Z level

Lower Z level

Figure 7:
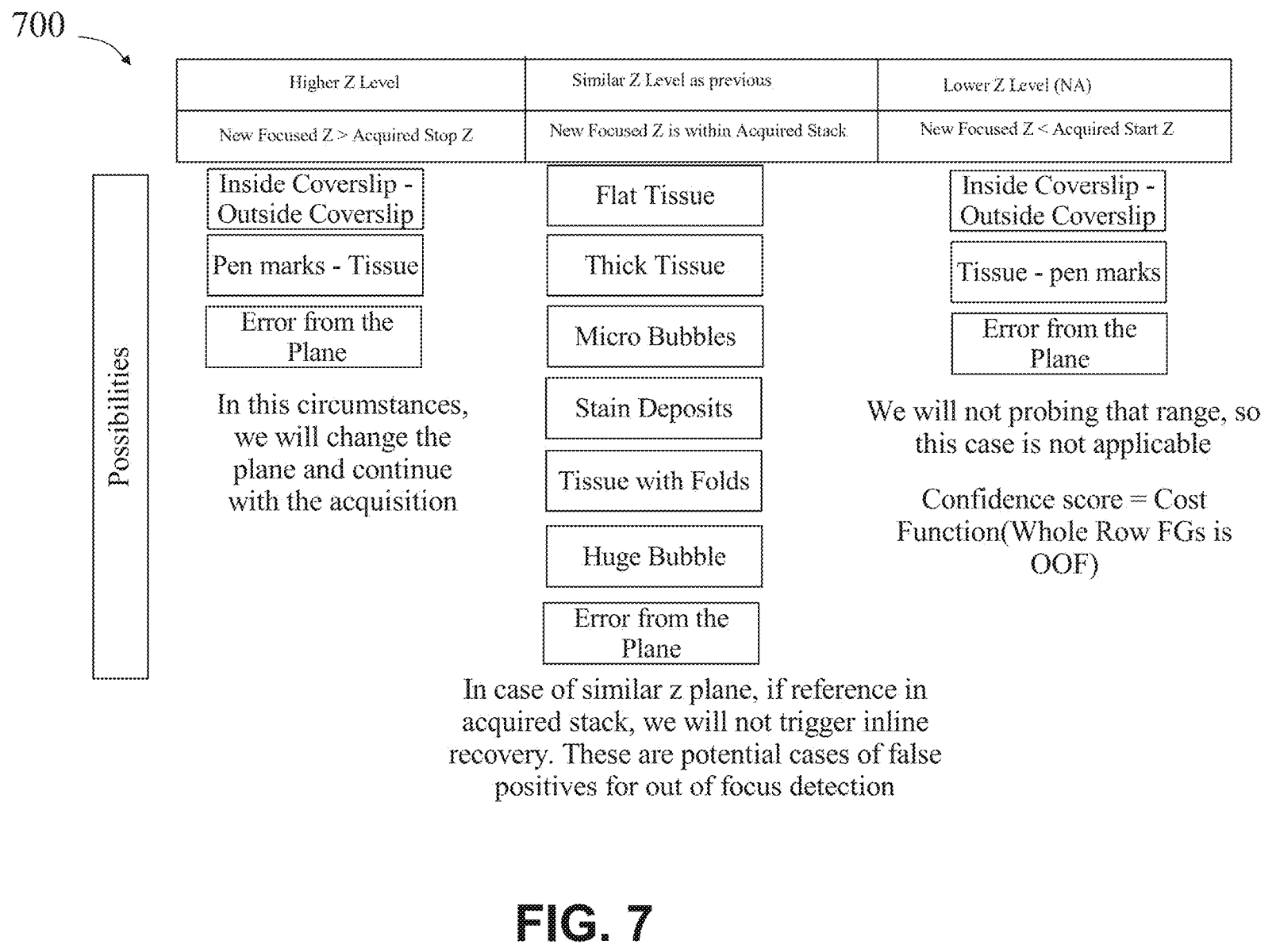

700

| Higher Z Level | Similar Z Level as previous | Lower Z Level (NA) |
| --- | --- | --- |
| New Focused Z > Acquired Stop Z | New Focused Z is within Acquired Stack | New Focused Z < Acquired Start Z |

Possibilities

| Higher Z Level | Similar Z Level as previous | Lower Z Level (NA) |
| --- | --- | --- |
| Inside Coverslip - Outside Coverslip | Flat Tissue | Inside Coverslip - Outside Coverslip |
| Pen marks - Tissue | Thick Tissue | Tissue - pen marks |
| Error from the Plane | Micro Bubbles | Error from the Plane |
| | Stain Deposits | |
| | Tissue with Folds | |
| | Huge Bubble | |
| | Error from the Plane | |

In this circumstances, we will change the plane and continue with the acquisition In case of similar z plane, if reference in acquired stack, we will not trigger inline recovery. These are potential cases of false positives for out of focus detection We will not probing that range, so this case is not applicable Confidence score = Cost Function(Whole Row FGs is OOF)

Triggering Z plane update based on Z difference

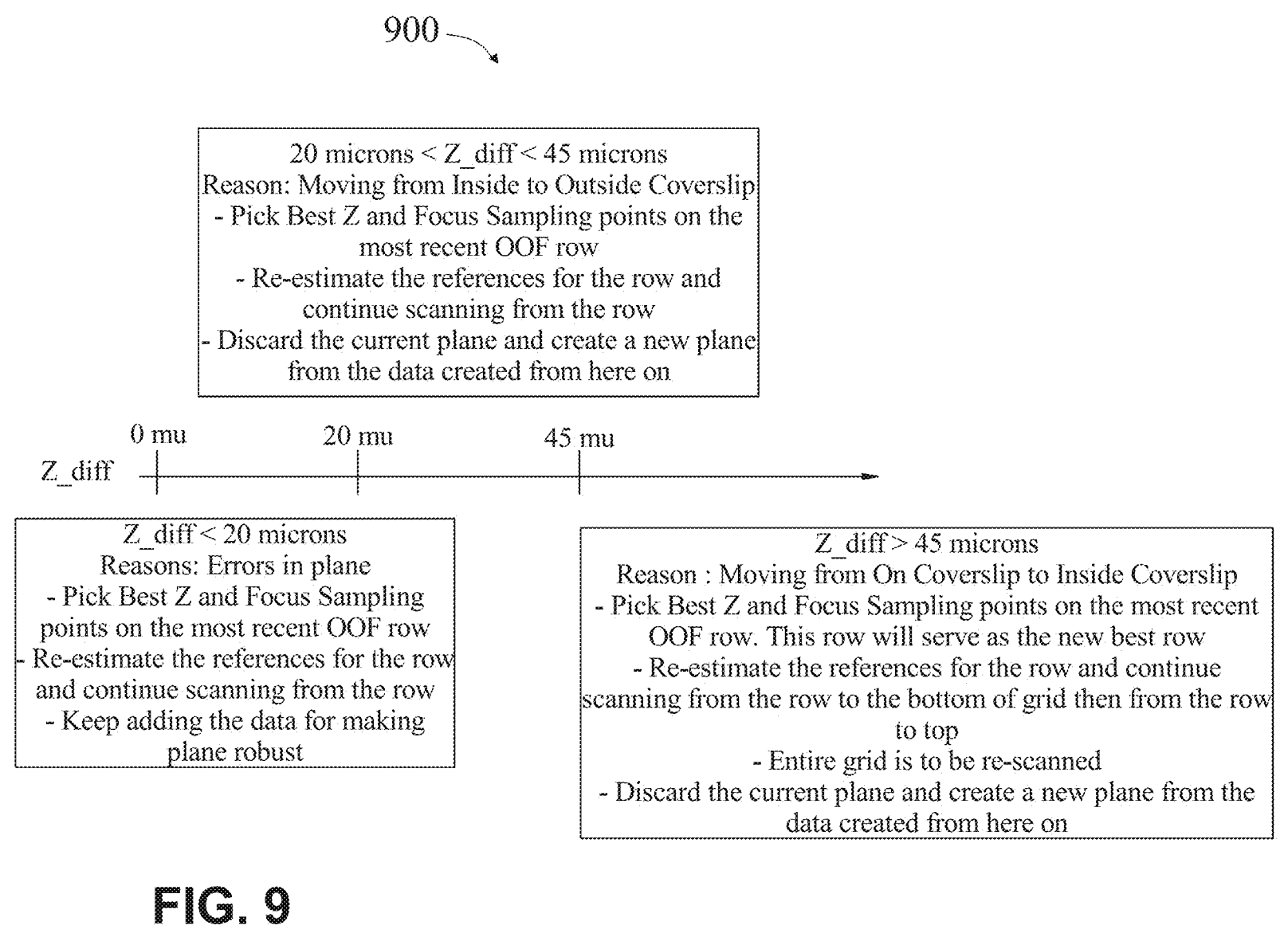

900

20 microns < Z_diff < 45 microns
Reason: Moving from Inside to Outside Coverslip
- Pick Best Z and Focus Sampling points on the most recent OOF row
- Re-estimate the references for the row and continue scanning from the row
- Discard the current plane and create a new plane from the data created from here on Z_diff
0 mu
20 mu
45 mu Z_diff < 20 microns
Reasons: Errors in plane
- Pick Best Z and Focus Sampling points on the most recent OOF row
- Re-estimate the references for the row and continue scanning from the row
- Keep adding the data for making plane robust Z_diff > 45 microns
Reason : Moving from On Coverslip to Inside Coverslip
- Pick Best Z and Focus Sampling points on the most recent OOF row. This row will serve as the new best row
- Re-estimate the references for the row and continue scanning from the row to the bottom of grid then from the row to top
- Entire grid is to be re-scanned
- Discard the current plane and create a new plane from the data created from here on

FIG. 9

APPARATUS AND METHOD FOR INLINE DETECTION AND MODIFICATION OF SUBOPTIMAL SCAN VIEWS OF A PLURALITY OF CONSECUTIVE IMAGES

FIELD OF THE INVENTION

The present invention generally relates to the field of imaging systems. In particular, the present invention is directed to an apparatus and a method for inline detection and modification of suboptimal scan views of a plurality of consecutive images.

BACKGROUND

High-throughput imaging systems frequently encounter inconsistent focus across consecutive image frames, especially when scanning biological samples mounted under coverslips with uneven surfaces or varying sample thickness. These inconsistencies may result in the capture of suboptimal images that fail to meet diagnostic or analytical quality thresholds. In many cases, traditional focus mechanisms do not adequately account for localized focus drift, sudden Z-plane shifts, or mounting artifacts that disrupt imaging continuity.

SUMMARY OF THE DISCLOSURE

In an aspect, an apparatus for inline detection and modification of suboptimal scan views of a plurality of consecutive images includes at least an imaging device configured to capture a plurality of consecutive images, at least a computing device communicatively connected to the at least an imaging device, wherein the computing device comprises a memory and at least a processor communicatively connected to the memory, wherein the memory contains instructions configuring the at least a processor to receive, using the at least a processor, the plurality of consecutive images from the at least an imaging device, wherein each consecutive image of the plurality of consecutive images is associated with at least an image metric, detect, using the at least a processor, a first consecutive image and a second consecutive image of the plurality of consecutive images are out of specification based on one or more metrics and quality data, wherein the first consecutive image and the second consecutive image are suboptimal, identify, using the at least an imaging device, a probed focal plane associated with the second consecutive image by collecting, using the at least an imaging device, a plurality of probed images at different focal planes at a location of the second consecutive image, and determining, using the at least a processor, the probed focal plane for the location of the second consecutive image as a function of the plurality of probed images, conditionally modify, using the at least a processor, the one or more metrics associated with the at least an imaging device as a function of the probed focal plane, and initiate, using the at least an imaging device, a rescanning operation of the second consecutive image as a function of the probed focal plane.

In another aspect, a method for inline detection and modification of suboptimal scan views of a plurality of consecutive images includes capturing, using at least an imaging device, a plurality of consecutive images, receiving, using at least a processor communicatively connected to the at least an imaging device, a plurality of consecutive images from at least an imaging device, wherein the plurality of consecutive images comprises one or more metrics associated with quality data, detecting, using the at least a processor, a first consecutive image and a second consecutive image of the plurality of consecutive images are out of specification based on one or more metrics and quality data, wherein the first consecutive image and the second consecutive image are suboptimal, identifying, using the at least an imaging device, a probed focal plane associated with the second consecutive image by collecting, using the at least an imaging device, a plurality of probed images at different focal planes at a location of the second consecutive image and determining, using the at least a processor, the probed focal plane for the location of the second consecutive image as a function of the plurality of probed images and a range associated a quality deviation between the first consecutive image and the second consecutive image, conditionally modifying, using the at least a processor, the one or more metrics associated with the at least an imaging device as a function of the probed focal plane, and initiating, using the at least an imaging device, a rescanning operation of the second consecutive image as a function of the probed focal plane.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7 is an illustration of a Z-plane classification breakdown;

FIG. 9 is an illustration of a Z-difference based stack range estimation process;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for inline detection and modification of suboptimal scan views of a plurality of consecutive images. The apparatus includes at least a computing device comprised of a processor and a memory communicatively connected to the processor. The memory instructs the processor to receives the plurality of consecutive images from the at least an imaging device, wherein each consecutive image of the plurality of consecutive images is associated with at least an image metric. The processor detects a first consecutive image and a second consecutive image of the plurality of consecutive images are out of specification based on one or more metrics and quality data, wherein the second consecutive image is suboptimal. The processor identifies, using the at least an imaging device, a probed focal plane associated with the second consecutive image by collecting, using the at least an imaging device, a plurality of probed images at different focal planes at a location of the second consecutive image and determining, using the at least a processor, the probed focal plane for the location of the second consecutive image as a function of the plurality of probed images. The processor conditionally modifies the one or more metrics associated with the at least an imaging device as a function of the probed focal plane. The processor initiates, using the at least an imaging device, a rescanning operation of the second consecutive image as a function of the probed focal plane.

Figure 1:
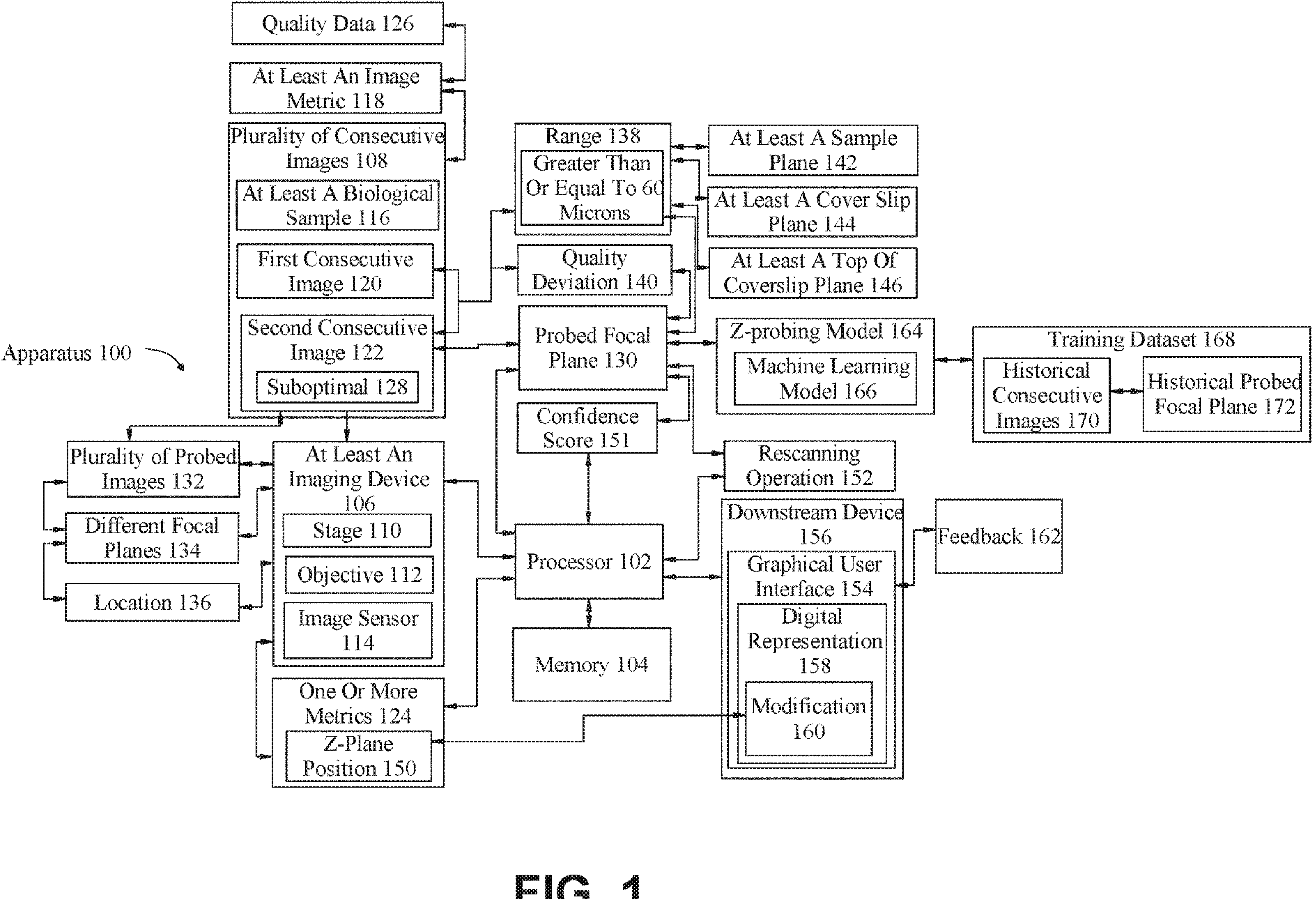
FIG. 1 is a block diagram of an apparatus for inline detection and modification of suboptimal scan views of a plurality of consecutive images.

Referring now to FIG. 1, an exemplary embodiment of apparatus 100 for inline detection and modification of suboptimal scan views of a plurality of consecutive images is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, the apparatus 100 includes at least an imaging device 106 configured to capture a plurality of consecutive images 108. As used in this disclosure, an "imaging device" is hardware configured to capture visual data in the form of digital or analog images. Without limitation, the at least an imaging device 106 may include a camera, video recorder, sensor array, or other optical capture unit capable of recording or scanning a scene, object, or subject. In an embodiment, the imaging device 106 may be used for the purpose of generating image-based data. The imaging device 106 may also include lenses, filters, light sources, or other supporting elements that enhance or modify the capture process. In some embodiments, the imaging device 106 may be integrated into a larger system, such as a mobile platform, medical scanner, surveillance unit, or industrial inspection apparatus 100.

With continued reference to FIG. 1, as used in this disclosure, "consecutive images" are visual recordings captured in a continuous or sequential manner such that each image immediately follows the previous one in time. In an embodiment, the consecutive images 108 may include an interval between each consecutive image which may be consistent and based on a fixed frame rate, variable such as on a triggering condition or dynamic event, or defined by a temporal sampling protocol. Consecutive images 108 may form a video stream, a time-lapse series, or a burst sequence, and they may be used to analyze motion, detect changes, or reconstruct dynamic phenomena.

With continued reference to FIG. 1, the at least an imaging device 106 may include a stage 110, objective 112, and image sensor 114, and wherein the at least a processor 102 is further configured to communicate with the imaging device 106 to capture the plurality of consecutive images 108 and receive, from the imaging device 106, the plurality of consecutive images 108. As used in this disclosure, a "stage" is a component of the imaging device 106. In an embodiment, the stage 110 may be a structural platform that is configured to hold, position, or manipulate a specimen or subject for image capture. The stage 110 may be stationary or movable, and may incorporate mechanisms for adjusting position along one or more axes, such as translational or rotational movement, to enable accurate alignment or scanning of the area of interest. As used in this disclosure, an "objective" is an optical component of the imaging device 106. The objective 112 may be configured to focus light or other electromagnetic radiation from the specimen or subject onto the image sensor 114. The objective 112 may include one or more lenses, mirrors, or other focusing elements and may be selected to provide a specific magnification, numerical aperture, or field of view based on the imaging application. The objective 112 may contribute to image resolution, contrast, and depth of field. As used in this disclosure, an "image sensor" is a component of the imaging device 106 that is configured to receive focused light or radiation from the objective 112 and convert it into electronic signals that represent an image. The image sensor 114 may be based on charge-coupled device technology or complementary metaloxide-semiconductor technology, or other light-detecting technologies. The image sensor 114 may support various resolutions, dynamic ranges, and frame rates, and may be configured to output digital or analog signals for further processing.

In an embodiment, the plurality of consecutive images 108 may be received by the at least a processor 102 through a communication interface with the imaging device 106. The image sensor 114 within the imaging device 106 converts optical signals into electronic image data, which is transmitted from the imaging device 106 to the processor 102 in a sequential manner. The processor 102 may receive the image data through a wired or wireless connection, such as over a serial communication bus, ethernet interface, or dedicated data channel. Each image in the plurality of consecutive images 108 is received as a discrete data packet or stream segment, which the processor 102 stores in memory for subsequent processing, analysis, or display. The receipt may occur in near real time, allowing the processor 102 to perform image-based operations such as enhancement, segmentation, or interpretation as the images are captured. For example, without limitation, the image sensor 114 within the imaging device 106 may capture each image by converting incoming optical signals, such as reflected or emitted light from biological tissue, into pixel-level electronic data. The image data may then be transmitted to the processor 102 using a high-speed serial interface, such as a USB 3.0 or THUNDERBOLT® connection, enabling the rapid transfer of high-resolution images in real time. In an embodiment, the imaging device 106 may be configured with a digital CMOS image sensor 114 that captures a sequence of consecutive images 108 of a biopsy sample 116 during microscopic analysis. Each image may be encoded into a digital file format, such as TIFF or DICOM, and sent to the processor 102 via an onboard data controller for real-time storage and visualization. Without limitation, the imaging device 106 may include an endoscopic imaging module with an embedded CCD image sensor 114. As the endoscope advances through a patient's gastrointestinal tract, the sensor continuously captures consecutive images 108, which are transmitted through a wired connection embedded within the scope to the processor 102. The processor 102 receives each image frame and queues it in memory to construct a continuous video feed for display on a surgical monitor. For example, without limitation, a fluoroscopic imaging device 106 may capture consecutive X-ray frames of a catheter insertion and send them wirelessly to a central processing workstation. The image sensor 114 in the fluoroscope may digitize the X-ray exposure data, and the resulting images are transmitted as compressed video data over a secure wireless medical network. The processor 102 may receive each frame, decompress the data, and display it for real-time surgical guidance. In an embodiment, the image sensor 114 of a retinal imaging camera may capture high-resolution fundus images as a patient's eye is scanned in a fixed sequence. The sensor may output each image frame as a digital signal through a FIREWIRE® or ethernet interface, and the processor 102 receives and aggregates the consecutive images 108 for use in constructing a panoramic view of the retina.

With continued reference to FIG. 1, the plurality of consecutive images 108 may represent at least a biological sample 116. As used in this disclosure, a "biological sample" is a material derived from an organism. The biological sample 116 may be collected, prepared, and analyzed for the purpose of observation, diagnosis, research, or treatment. The biological sample 116 may include, without limitation, tissues, cells, blood, plasma, serum, urine, saliva, mucus, or biopsy material, and may originate from humans, animals, plants, or microorganisms. For example, without limitation, the biological sample 116 may be a histological tissue section collected during a clinical biopsy, prepared on a glass slide, and imaged using a brightfield microscope to assess cellular architecture. In an embodiment, the biological sample 116 may be a cytological smear derived from a fluid sample 116, such as cerebrospinal fluid or pleural effusion, where consecutive images 108 are captured to identify abnormal cell morphology. Without limitation, the biological sample 116 may include organoids or cultured cell lines imaged over time to monitor changes in viability or response to a treatment. In an embodiment, for example, without limitation, the plurality of consecutive images 108 may represent a stained histological section of breast tissue obtained from a core needle biopsy, where the imaging device 106 captures sequential high-resolution images across the sample 116 to assess for the presence of malignant cells. In an embodiment, the plurality of consecutive images 108 may represent a Pap smear sample 116 containing exfoliated cervical cells, where the images are acquired in a scanning sequence to detect morphological abnormalities associated with precancerous conditions. Without limitation, the plurality of consecutive images 108 may represent a peripheral blood smear, where individual frames capture adjacent fields of view across the slide to evaluate white blood cell morphology and red blood cell distribution for signs of hematologic disorders.

Still referring to FIG. 1, processor 102 is configured to receive the plurality of consecutive images 108 from the at least an imaging device 106, wherein each consecutive image of the plurality of consecutive images 108 is associated with at least an image metric 118. As used in this disclosure, an "image metric" is a quantifiable parameter associated with a digital image that characterizes one or more aspects of the image. For example, without limitation, the image metric 118 may characterize the quality, structure, or content of an image. Without limitation, the image metric 118 may be computed using pixel-level data, statistical analysis, or algorithmic evaluation, and may be used to assess sharpness, contrast, brightness, focus, signal-to-noise ratio, resolution, or other properties relevant to the utility of the image for diagnostic, analytical, or operational purposes. For example, without limitation, an image metric 118 may include a numerical sharpness score calculated using edge detection to quantify how well-defined structures appear in the image. In an embodiment, an image metric 118 may comprise a contrast-to-noise ratio that compares the intensity differences between adjacent regions against background variability. Without limitation, other image metrics 118 may include a brightness histogram, a motion blur index, and/or a calculated Z-plane offset from the intended focal plane, each providing feedback used to identify sub-optimal 128 images and guide corrective actions such as rescanning or parameter adjustment.

With continued reference to FIG. 1, without limitation, the image metric 118 may be derived through computational analysis of pixel-level data extracted from each consecutive image. The derivation process may involve mathematical operations, signal processing techniques, or machine learning models that evaluate visual features indicative of image quality or diagnostic utility. For example, without limitation, a sharpness image metric 118 may be derived by applying a Laplacian or Sobel filter to the image to detect edge gradients, followed by calculating the variance or mean of the resulting values to quantify edge clarity. As used in this disclosure, a "Laplacian filter" is an image processing operation that highlights areas of rapid intensity change by computing the second derivative of pixel intensity. As used in this disclosure, a "Sobel filter" is a gradient-based edge detection operator that approximates the first derivative of image intensity. For example, without limitation, a sharpness image metric 118 may be derived by first applying a Laplacian filter to the image, which enhances areas of rapid intensity change and highlights edges within the image. The Laplacian filter may generate a new image emphasizing edge structures by computing second-order derivatives of pixel intensity. The resulting edge-enhanced image is then analyzed by calculating the variance of its pixel values, where a higher variance indicates the presence of stronger, clearer edges and therefore a sharper image. Additionally and/or alternatively, the mean of the absolute Laplacian values may be computed as a simplified sharpness score. In an embodiment, the Sobel filter may be applied, which uses convolution kernels to approximate the gradient of image intensity in both the horizontal and vertical directions. These gradient maps may be combined to form a magnitude image representing the edge strength. The system may then derive the sharpness metric by calculating the statistical distribution, such as the standard deviation or average, of these gradient magnitudes. Images with low gradient variation suggest blurriness, while images with high, well-defined gradients indicate sharpness. The image metric 118 may be stored or used in real time to assess image quality or trigger a corrective action. In an embodiment, a contrast metric may be derived by computing the standard deviation of pixel intensity values within defined regions of interest, providing a measure of local or global contrast across the image. Without limitation, a brightness image metric 118 may be derived by calculating the mean pixel intensity or generating a histogram of grayscale values to assess exposure levels. Without limitation, a focus-related Z-offset metric may be derived by capturing multiple probed images 132 at different focal planes 134 and analyzing which plane produces the highest sharpness score, thereby estimating the deviation of the captured image from the optimal focal plane. As used in this disclosure, a "focus-related Z-offset metric" is a quantitative value that represents the axial deviation between the focal plane at which an image was captured and the optimal focal plane that yields the highest image quality. The focus-related Z-offset metric may be derived by analyzing a set of probed images 132 collected at multiple focal planes and determining which plane produces the clearest or sharpest image, as measured by one or more image metrics 118. For example, without limitation, a focus-related Z-offset metric may be derived by first capturing a stack of probed images 132 at incrementally spaced focal planes around the location 136 of interest. Each probed image in the stack corresponds to a distinct Z-plane position 150 relative to the sample 116, such as below, at, and above the coverslip surface. For each image in the stack, a sharpness score may be computed using an edge-detection technique, such as applying a Laplacian filter followed by a variance calculation to quantify edge clarity. Once the sharpness scores are obtained, the system may compare them to identify the focal plane that yielded the highest sharpness value, which is assumed to represent the optimal or most in-focus plane. The Z-offset metric may then be calculated as the distance between the focal plane of the originally captured, and potentially suboptimal 128, image and the identified optimal focal plane. Without limitation, the offset quantifies how far out of focus the original image was and may be expressed in microns or in units corresponding to the step size between probed planes. In an embodiment, this Z-offset metric may be used by the processor 102 to initiate a correction, such as repositioning the imaging objective 112 or stage 110 to the optimal focal plane, and triggering a rescanning operation 152 to improve image quality. Without limitation, the Z-offset metric may also be logged for quality tracking, trend analysis, or training a machine learning model 166 to predict focus deviations under similar conditions.

Without limitation, in an embodiment, a noise metric may be derived by estimating random intensity variation across homogeneous regions using algorithms such as wavelet decomposition or Fourier transforms. As used in this disclosure, a "noise metric" is a quantitative measure that characterizes the amount or severity of random, non-informative intensity variation present in an image. For example. The noise metric may be present particularly in regions expected to exhibit uniform visual properties. The noise metric may be used to assess image quality, detect acquisition errors, or guide corrective actions in imaging systems. For example, without limitation, a noise metric may be derived by isolating homogeneous regions of an image, such as background areas or uniformly stained tissue, and analyzing the pixel intensity fluctuations within those regions. In an embodiment, the noise metric may be calculated by applying wavelet decomposition to separate high-frequency components associated with random variation from structural features, followed by estimating the energy or standard deviation in those high-frequency bands. Without limitation, a Fourier transform may alternatively be applied to shift the image into the frequency domain, where noise is estimated by evaluating power levels in frequency regions not typically associated with anatomical detail. The noise metric may be expressed as a single value or as a spatial map and may be used to flag suboptimal 128 images for review or rescanning. Without limitation, these derivations may be performed in real time by processor 102 during or immediately after image acquisition, enabling downstream evaluation and automated decision-making regarding image quality and system response.

Still referring to FIG. 1, processor 102 is configured to detect a first consecutive image 120 and a second consecutive image 122 of the plurality of consecutive images 108 are out of specification based on one or more metrics 124 and quality data 126, wherein the second consecutive image 122 is suboptimal 128. As used in this disclosure, "quality data" is information associated with one or more characteristics of an image. In an embodiment, the quality data 126 may be used to evaluate the adequacy or acceptability of that image for a particular purpose, such as diagnostic interpretation, machine learning analysis, or procedural guidance. Quality data 126 may include, without limitation, image metrics 118, such as sharpness, contrast, brightness, noise, focus offset, and the like, contextual metadata, such as time of capture, stage 110 position, objective 112 magnification, exposure settings, and the like, and threshold values or specification criteria derived from system calibration, operator settings, or regulatory standards. For example, without limitation, quality data 126 may include a combination of sharpness score and exposure time recorded for each image, along with acceptable tolerance ranges for each metric. In an embodiment, quality data 126 may be stored as part of the image metadata or transmitted separately to a processor 102 for real-time evaluation. Without limitation, the quality data 126 may be used to compare newly captured images against specification thresholds to identify whether an image meets or deviates from expected standards.

With continued reference to FIG. 1, as used in this disclosure, "suboptimal" is a condition in which an image fails to meet one or more predefined quality criteria. In an embodiment, a suboptimal 128 condition may reduce an image in its utility or reliability for the intended imaging task. A suboptimal 128 image may exhibit one or more deficiencies such as low sharpness, incorrect focal plane, excessive noise, uneven illumination, or contrast levels outside of acceptable bounds. For example, without limitation, an image may be classified as suboptimal 128 if its sharpness metric falls below a threshold value indicating that the image is out of focus. For example, without limitation, an image may be classified as suboptimal 128 if its sharpness metric falls below a threshold value indicating that the image is out of focus. Continuing, the processor 102 may evaluate the sharpness of the image by applying a Laplacian filter to enhance edges and compute the variance of the filtered result. If the variance value is significantly lower than a predetermined threshold, such as a value established during system calibration or derived from prior high-quality images, the processor 102 may determine that the image lacks sufficient edge detail and fine structure, both of which are indicative of defocus. As used in this disclosure, a "predetermined threshold" is a value used by the apparatus 100 to evaluate whether a measured or computed parameter meets, exceeds, or falls below an acceptable limit. The predetermined threshold may be established through calibration, empirical observation, clinical guidelines, or training data and may serve as a decision point for classifying, triggering, or adjusting operations within the imaging apparatus. For example, without limitation, a predetermined threshold may represent the minimum acceptable sharpness score required for a digital image to be considered in focus. In an embodiment, the predetermined threshold may be a static value, such as a sharpness score of 0.75, defined by prior validation studies. Without limitation, the predetermined threshold may be dynamically adjusted based on operational context, such as tissue type, imaging modality, or real-time feedback 162 from downstream quality control systems. In an embodiment, the predefined threshold value may be adaptive, where processor 102 compares the current sharpness metric to a rolling average of sharpness metrics computed from previously acquired in-focus images. If the current image exhibits a sharpness score that is two standard deviations below this moving average, the image may be flagged as statistically suboptimal 128. Without limitation, the image may also be paired with metadata indicating its Z-plane position 150. If the sharpness score is low and the Z-position deviates from the optimal focal plane by more than a predefined offset, such as five microns, the image may be deemed both out of focus and spatially misaligned. In this case, processor 102 may not only classify the image as suboptimal 128 but also initiate a corrective adjustment to the imaging system, such as a Z-stage repositioning followed by an automated rescanning operation 152. In an embodiment, an image may be deemed suboptimal 128 if it was acquired at an incorrect Z-plane, as indicated by a focus-related Z-offset metric exceeding a certain distance. Without limitation, suboptimal 128 images may be flagged for rescanning, excluded from downstream analysis, or used to trigger automatic adjustments in imaging parameters.

Still referring to FIG. 1, processor 102 is configured to identify, using the at least an imaging device 106, a probed focal plane 130 associated with the second consecutive image 122 by collecting, using the at least an imaging device 106, a plurality of probed images 132 at different focal planes 134 at a location 136 of the second consecutive image 122 and determining, using the at least a processor 102, the probed focal plane 130 for the location 136 of the second consecutive image 122 as a function of the plurality of probed images 132. As used in this disclosure, a "probed focal plane" is a depth within a sample 116 volume that is determined to yield the highest image quality among a plurality of candidate focal planes. In an embodiment, the probed focal plane 130 may be evaluated by the imaging device 106. In an embodiment, the probed focal plane 130 may be evaluated by the imaging device 106 using one or more real-time image quality metrics calculated for each of the probed images 132 captured at varying Z-positions. The imaging device 106 may apply edge-detection filters, contrast measurements, and/or texture analysis algorithms to each probed image and compare the resulting values to identify the depth that yields the highest image fidelity. For example, without limitation, the imaging device 106 may compute a sharpness score for each probed image using a Laplacian-based method and determine the focal plane with the maximum score as the probed focal plane 130. In an embodiment, the imaging device 106 may analyze intensity histograms or entropy levels across the probed images 132 to identify the plane with the most balanced exposure and detail preservation. Without limitation, the imaging device 106 may use a trained machine learning model 166 deployed at the edge to infer focus quality directly from the image content. The model may be configured to return a probability or confidence score for each image, and the focal plane corresponding to the highest confidence score may be selected as the probed focal plane 130. In an embodiment, the imaging device 106 may evaluate the probed focal plane 130 by detecting a transition between under- and over-focused conditions across a sweep of Z-planes and interpolating the depth of maximum focus based on a curve fit of sharpness values. This may enable sub-micron precision in determining the optimal imaging depth. The probed focal plane 130 may correspond to the optical position along the Z-axis that produces the sharpest or most diagnostically useful image based on one or more image metrics 118, such as sharpness, contrast, or focus offset. The probed focal plane 130 may be dynamically identified during image acquisition or rescanning operations 152 to correct for focus deviations.

With continued reference to FIG. 1, as used in this disclosure, "probed images" are images captured by the imaging device 106 of the sample 116. In an embodiment, the probed images 132 may be captured by the imaging device 106 at sequential or non-sequential focal planes near a specified location 136 within a sample 116. Each probed image represents a different depth or Z-plane and is used by the processor to assess focus quality across the axial range 138. Probed images 132 may be collected to identify the focal plane that yields the optimal imaging result and may be used in real time or retrospectively to guide rescanning or corrective adjustments. As used in this disclosure, a "focal plane" is the specific axial depth at which the optical components of the imaging system are focused within a sample 116. Without limitation, the focal plane may result in the clearest or most in-focus image at that depth. The focal plane may correspond to a physical distance from the imaging sensor or lens system and may vary based on sample height, mounting variations, or system calibration. Images captured at the focal plane may exhibit maximum sharpness and structural detail relative to adjacent planes. As used in this disclosure, a "location" is a defined position within a sample 116 area that corresponds to a region of interest for image acquisition or analysis. The location 136 may be expressed in spatial coordinates relative to the imaging stage 110 or optical field and may be identified based on sample layout, scan path, or metadata associated with previously acquired images. In the context of probed focal plane 130 identification, the location 136 refers to the lateral and axial position of the second consecutive image 122 within the sequence of images. In an embodiment, the location 136 may be expressed as a set of spatial coordinates relative to the imaging stage 110, such as an X-Y-Z position measured in microns or stage 110 motor steps. For example, without limitation, the imaging device 106 may store the position of each image as metadata, where the second consecutive image 122 is associated with X=12,500 microns, Y=8,200 microns, and Z=35 microns. These coordinates may allow the processor 102 to return precisely to the same physical region of the sample 116 for further imaging or rescanning. Without limitation, the location 136 may be defined in terms of the optical field of view, where the imaging system segments the biological sample 116 into a grid or tile map. Each tile may be assigned a unique identifier, such as Tile 14B or Region 7×3, and the second consecutive image 122 may be recognized as belonging to a specific tile in the scan layout. The tile-based location 136 system may be used to manage large-scale scans of whole-slide images. In an embodiment, the location 136 of the second consecutive image 122 may be inferred from the scan path or motion profile of the imaging stage 110. For instance, if the imaging device 106 scans left to right and top to bottom, the system may track the current frame number in the acquisition sequence to determine the lateral and axial position of the image. This may enable spatial correlation between consecutive images 108 and simplifies error localization when a suboptimal 128 image is detected. For example, without limitation, metadata associated with a prior image in the sequence may indicate that the sample thickness at a given lateral region varies, prompting the processor 102 to anticipate a likely shift in the focal plane at that location 136. The imaging device 106 may use this information to automatically adjust the Z-stage or refine its probed image collection range when determining the probed focal plane 130.

With continued reference to FIG. 1, in an embodiment, the imaging device 106 may collect the plurality of probed images 132 by incrementally adjusting its Z-position relative to the sample 116 at the location 136 of the second consecutive image 122. For example, without limitation, the imaging device 106 may move the objective 112 lens or the sample 116 stage 110 vertically in small, controlled steps, such as one micron or less per step, acquiring a new image at each Z-increment. This may result in a stack of images, each corresponding to a different focal plane, collectively referred to as the probed images 132. Without limitation, the imaging device 106 may use predefined scan parameters to define the range 138 and step size for Z-sampling. For instance, without limitation, if the second consecutive image 122 is identified as suboptimal 128 due to being out of focus, the imaging system may initiate a focus sweep from 25 microns below to 25 microns above the original Z-position, capturing probed images 132 at every 2-micron increment across that range 138. In an embodiment, the imaging device 106 may also use adaptive or data-driven logic to define the range 138 of probed images 132. For example, without limitation, the system may analyze the quality deviation 140 between the first consecutive image 120 and second consecutive image 122 and set the Z-sampling range 138 based on the estimated focus offset, thereby minimizing unnecessary image acquisition. In an embodiment, the imaging device 106 may also use adaptive or data-driven logic to define the range 138 of probed images 132 based on contextual information derived from previously captured image data or real-time quality feedback 162. Rather than performing a fixed-range 138 Z-stack acquisition around every location 136, the imaging device 106 may evaluate image quality deviations 140, such as sharpness drops, brightness inconsistencies, or focus-related metrics, between consecutive images 108 in the scan path. If a significant degradation is detected, the apparatus 100 may automatically expand or shift the Z-range 138 for the next set of probed images 132 to ensure the optimal focal plane is captured. For example, without limitation, if the processor 102 identifies that the sharpness metric of the second consecutive image 122 is 40 percent lower than that of the first image, it may infer a likely focal drift and instruct the imaging device 106 to collect a wider Z-range 138 of probed images 132, such as from −40 microns to +40 microns relative to the current plane, instead of a default ±20 micron sweep. In an embodiment, the imaging device 106 may reference historical metadata for the same region of the biological sample 116, such as tissue thickness variations or slide warping data, to predict and preconfigure the Z-range 138 most likely to contain the best focus. Without limitation, the adaptive logic may allow the imaging system to minimize unnecessary image capture in well-aligned regions while intelligently broadening the Z-stack only when quality degradation is detected, improving both speed and accuracy in the identification of the probed focal plane 130.

With continued reference to FIG. 1, once the probed images 132 are collected, processor 102 may determine the probed focal plane 130 by analyzing image quality metrics across the stack. For example, without limitation, the processor 102 may compute a sharpness score for each image using a Laplacian variance method or gradient-based edge analysis. The image with the highest sharpness score may be designated as the most in-focus, and its corresponding Z-position may be selected as the probed focal plane 130. In an embodiment, the processor 102 may apply a model-based approach, such as fitting a curve to the sharpness scores across Z-positions and identifying the peak of the curve to determine the optimal focal plane with sub-micron precision. Continuing, this technique may reduce the effects of noise or minor inconsistencies in the metric values. Without limitation, the processor 102 may also use a trained machine learning model 166 to evaluate each probed image for focus quality. The model may assign a confidence score to each image, and the image with the highest score may be mapped to its respective Z-coordinate to define the probed focal plane 130. In an embodiment, the system may determine the probed focal plane 130 not only by selecting the best single image, but also by averaging or interpolating between multiple high-quality images if focus quality appears evenly distributed across a narrow Z-range 138. This may enable robust focal plane estimation even in samples 116 with subtle transitions or uneven surfaces.

With continued reference to FIG. 1, wherein the at least a processor 102 may be further configured to determine the probed focal plane 130 for the location 136 of the second consecutive image 122 as a function of a range 138 associated a quality deviation 140 between the first consecutive image 120 and the second consecutive image 122. As used in this disclosure, a "range" is a defined interval along a spatial axis. In an embodiment, the spatial axis may include the Z-axis. As used in this disclosure, the "Z-axis" is the spatial axis that represents depth or axial position relative to the focal plane of the imaging device 106. Movement along the Z-axis may correspond to changes in focus, with each position along this axis representing a different vertical plane within the sample 116. The Z-axis may be orthogonal to the X-axis and Y-axis, which define the horizontal and lateral dimensions of the sample 116 area. For example, without limitation, adjusting the objective 112 lens or sample 116 stage 110 along the Z-axis allows the imaging device 106 to bring different tissue layers or cellular structures into focus. In an embodiment, the Z-axis may be calibrated in microns, and precise movements along this axis may be used to generate a stack of probed images 132 at multiple focal planes. Without limitation, accurate control of the Z-axis may be critical for identifying the probed focal plane 130, correcting suboptimal 128 images, and performing high-resolution volumetric imaging. In an embodiment, the range 138 may be a defined interval along a spatial axis over which the imaging device 106 may collect data or perform analysis. The range 138 may be expressed in microns or in discrete image steps, and it may define the upper and lower bounds of focal plane sampling at a specific location 136. The range 138 may be fixed, user-defined, or dynamically adjusted based on image quality, historical data, or predictive models. In an embodiment, the range 138 may be fixed, meaning the imaging device 106 may be preconfigured to probe a set span along the Z-axis regardless of contextual factors. For example, without limitation, the imaging device 106 may be set to collect probed images 132 from −20 microns to +20 microns around the original Z-position of the second consecutive image 122, capturing one image every 2 microns. In an embodiment, the fixed range 138 may be selected based on empirical validation for a particular tissue type or scanning protocol. In another embodiment, the range 138 may be user-defined, where an operator may manually set the upper and lower Z-limits based on the expected thickness of the biological sample 116 or based on visual inspection of initial images. For example, without limitation, a user may define a custom Z-range of −10 to +40 microns in anticipation of coverslip tilt or sample 116 unevenness in that region. This may allow flexibility for unique sample 116 preparations or research settings where automation may need to be supplemented by expert input. Without limitation, the range 138 may be dynamically adjusted by the apparatus 100 in response to real-time feedback 162 or historical trends. In an embodiment, if the processor 102 detects a significant drop in sharpness or contrast between the first and second consecutive images 122, indicating a quality deviation 140, the apparatus 100 may automatically widen the Z-range from a default ±20 microns to ±50 microns. Continuing, this dynamic expansion may ensure the probed focal plane 130 is captured even when the sample 116 exhibits unexpected variability. For example, without limitation, the apparatus 100 may access historical scan data indicating that a particular region of the slide frequently exhibits tissue folding or mounting artifacts. Without limitations, based on this historical metadata, the processor 102 may predict a likely focus deviation and instruct the imaging device 106 to initiate a deeper Z-sweep in that region. In an embodiment, a machine learning model 166 may further predict the appropriate range 138 based on patterns in image metrics 118 or spatial location 136, allowing the imaging system to adapt intelligently in real time. Without limitation, the range 138 may include a ±20 micron sweep centered around the original Z-position of the second consecutive image 122. In an embodiment, the range 138 may be expanded to ±50 microns in response to a detected quality degradation, allowing the imaging device 106 to probe a wider set of focal planes in search of optimal focus.

With continued reference to FIG. 1, the range 138 of the plurality of probed images 132 of the second consecutive image 122 that is suboptimal 128 may be associated with at least a sample plane 142, at least a cover slip plane 144, and at least a top of coverslip plane 146. As used in this disclosure, a "sample plane" is the axial depth at which the main body of the biological material being imaged resides. The sample plane 142 typically corresponds to the focal plane that intersects the tissue section, cell layer, or other biological specimen mounted on the slide. The sample plane 142 may be the primary region of interest during image acquisition and may be expected to yield the clearest structural and diagnostic features when properly focused. As used in this disclosure, a "coverslip plane" is the axial depth that corresponds to the bottom surface of a coverslip placed over the biological sample 116. Without limitation, the axial depth is measured along the optical axis of the imaging system, that is, the direction the microscope objective is pointing. The coverslip plane may introduce optical boundaries that affect light transmission and focus quality. In an embodiment, accurate detection of the coverslip plane may be used to approximate the expected position of the sample 116 or correct for mounting artifacts. As used in this disclosure, a "top of coverslip plane" is the axial depth that corresponds to the uppermost surface of the coverslip. In an embodiment, the top of coverslip plane 146 may be opposite the surface in contact with the biological sample 116. In an embodiment, the top of coverslip plane 146 may be at the highest Z-position in the imaging path when scanning through the slide from bottom to top. Identifying the top of the coverslip plane may be useful for determining the total thickness of the mounted system and avoiding overextension of the focus range beyond the physical bounds of the slide. In an embodiment, identifying the top of the coverslip plane may assist the imaging system in estimating the total vertical thickness of the slide-mounted sample 116, including both the biological specimen and the optical boundaries introduced by the coverslip. Continuing, by detecting the upper limit, the apparatus 100 may prevent unnecessary or excessive probing beyond the physical confines of the sample 116, thereby reducing image acquisition time and minimizing mechanical strain on the imaging components. For example, without limitation, the imaging device 106 may initiate a Z-axis sweep that captures a series of low-resolution preview images across a broad focal range. As the objective 112 lens moves upward through the Z-axis, the system may analyze brightness, contrast, or refractive patterns in each image. A sudden drop in structural detail combined with a shift in light scattering may signal that the focal plane has passed above the top of the coverslip. At this point, the imaging device 106 may register the current Z-position as the top of the coverslip plane. In an embodiment, the processor 102 may use a change in optical signature, such as a flattening of the sharpness curve or a distinctive reflection pattern, as an indicator that the imaging beam is now focusing beyond the sample 116, possibly into air or mounting medium. Without limitation, this detection may be algorithmically reinforced using historical metadata or calibration values based on the known thickness of standard coverslips. Without limitation, identifying the top of the coverslip plane may also support automated focus constraints, ensuring that future Z-stacks are confined to a safe and efficient focal range that includes the sample plane 142 and coverslip plane but does not extend above the physical top boundary of the glass.

With continued reference to FIG. 1, the range 138 of the plurality of probed images 132 collected for the second consecutive image 122, which has been determined to be suboptimal 128, may span a set of key axial reference planes that define the vertical structure of the mounted sample 116. In an embodiment, this range may include at least a sample plane 142, at least a coverslip plane, and at least a top of coverslip plane 146, thereby allowing the imaging system to capture sufficient data to locate the optimal focus position. For example, without limitation, if the second consecutive image 122 is identified as being out of focus, the imaging device 106 may initiate a Z-stack acquisition that extends across a vertical range beginning below the biological sample 116, passing through the sample plane 142, and continuing upward through the coverslip to its top surface. Continuing, the apparatus 100 may acquire probed images 132 at various depths, some of which may contain the clearest rendering of the sample 116. This multi-plane probing may ensure that the processor 102 is equipped with sufficient information to identify the precise focal plane that delivers the highest image quality, which may be referred to as the optimal focus. In an embodiment, the inclusion of the sample plane 142 may ensure that the biological material itself is captured in varying degrees of sharpness, while the coverslip plane and top of coverslip plane 146 provide structural bounds that help the processor 102 contextualize focus deviations. Without limitation, sampling across this range may be especially valuable in cases where the biological sample 116 is not flat, the coverslip is tilted, or there are mounting irregularities that could shift the focal depth. The apparatus 100 may use this complete vertical profile to determine where optimal focus resides, and to ensure that subsequent rescans are performed at the most precise and relevant depth.

With continued reference to FIG. 1, the range 138 associated the quality deviation 140 may include greater than or equal to 60 microns. For example, without limitation, the imaging device 106 may capture a series of high-resolution brightfield images of a tissue biopsy on a slide. Processor 102 may detect that the sharpness score of the second consecutive image 122 is significantly lower than that of the first consecutive image 120, triggering a focus assessment routine. As used in this disclosure, a "focus assessment routine" is a sequence of operations executed by a processor 102 and/or imaging device 106 to evaluate whether a captured image is in focus. In an embodiment, if the image is not in focus the focus assessment routine may identify or correct the focal plane to improve image quality. The focus assessment routine may analyze one or more image metrics 118, such as sharpness, contrast, or brightness uniformity, and compare them against predetermined thresholds or historical benchmarks to determine the adequacy of focus. For example, without limitation, the focus assessment routine may begin when the processor 102 detects a drop in sharpness between two consecutive images 108. The focus assessment routine may then trigger the imaging device 106 to acquire a Z-stack of probed images 132 across a defined range, calculate sharpness scores for each image, and identify the Z-plane that yields the highest score as the optimal focal plane. In an embodiment, the focus assessment routine may also apply machine learning models 166 trained on labeled in-focus and out-of-focus images to estimate focus quality directly from image content. Without limitation, the focus assessment routine may be initiated in real time during scanning or as part of a rescanning operation 152 when a suboptimal 128 image is flagged. In response, the apparatus 100 may define a Z-axis probing range of 80 microns centered around the current focal position, based on the observed quality deviation 140. This extended 80-micron range may span from 40 microns below to 40 microns above the suboptimal 128 image plane to ensure that the true sample plane 142 is located, accounting for a possible focal drift or coverslip warping.

With continued reference to FIG. 1, in an embodiment, a fluorescent imaging system may be scanning a blood smear when the processor 102 detects a sudden drop in brightness uniformity and signal-to-noise ratio between two consecutive images 108. Without limitation, the apparatus 100 may infer that a significant axial misalignment has occurred, possibly due to a sudden shift in the sample mount. The processor 102 may define a range of 100 microns as the sampling window for the subsequent probed images 132, ensuring that the scanning system samples 116 all focal depths where meaningful signal may exist. This 100-micron range may exceed the standard probing interval and is justified by the magnitude of the quality deviation 140.

Still referring to FIG. 1, processor 102 may be configured to generate a confidence score 151 associated with the probed focal plane 130. As used in this disclosure, a "confidence score" is a numerical value generated by the processor 102 that reflects the degree of certainty associated with the identification of a particular probed focal plane 130. The confidence score 151 may be derived as a function of image quality metrics, comparative analysis across probed images 132, statistical consistency, and/or model-based inference. The confidence score 151 may be expressed on a normalized scale, such as from 0 to 1 or as a percentage, and may serve as an indicator of how likely the selected focal plane represents the true optimal focus for the biological sample 116. For example, without limitation, the processor 102 may compute sharpness scores for a stack of probed images 132 captured across a 100-micron Z-range. The processor 102 may identify a peak sharpness score at a depth of 36 microns and calculate the confidence score 151 based on how dominant this peak is compared to surrounding values. If the focal peak is sharp, narrow, and clearly distinct from nearby scores, the system may assign a high confidence score, such as 0.95, indicating strong certainty that the selected focal plane is optimal.

Still referring to FIG. 1, processor 102 is configured to conditionally modify the one or more metrics 124 associated with the at least an imaging device 106 as a function of the probed focal plane 130. In an embodiment, processor 102 may compare the probed focal plane 130 to current acquisition parameters and, when a deviation exceeds predefined tolerance limits, may adjust one or more imaging metrics so that subsequent images are captured under revised conditions that restore optimal focus and quality. For example, without limitation, if the probed focal plane 130 is discovered to be eight microns above the plane used for the second consecutive image 122, processor 102 may command the imaging device 106 to shift its Z-axis stage 110 upward those eight microns and simultaneously raise the sharpness metric threshold that must be met before the next frame is accepted. Without limitation, processor 102 may also fine-tune exposure time, detector gain, or illumination intensity whenever the confidence score 151 associated with the probed focal plane 130 falls below a target value, thereby ensuring that contrast and brightness metrics remain within specification after the focal correction. In an embodiment, the conditional modification may occur only once the confidence score 151 surpasses a certainty level, such as eighty-five percent, so that metrics are not changed on the basis of ambiguous focus data. For example, without limitation, a low certainty reading may prompt processor 102 to leave current metrics unchanged and to instruct the imaging device 106 to collect an additional, narrower Z-stack before making any adjustments. Without limitation, the ability to conditionally modify metrics in response to the probed focal plane 130 enables closed-loop, adaptive control that maintains high image fidelity while minimizing unnecessary rescans.

With continued reference to FIG. 1, the at least a processor 102 may be further configured to automatically modify a Z-plane position 150 of the one or more metrics 124 associated with the at least an imaging device 106. As used in this disclosure, a "Z-plane position" is a coordinate along the Z-axis at which the imaging device 106 is focused when capturing an image. The Z-plane position 150 may define the depth within the sample 116 or slide where the imaging optics are aligned, and it determines which structures appear in sharp focus. The Z-plane position 150 may be expressed in physical units such as microns and may be controlled through motorized movement of the imaging stage 110 or objective lens. For example, without limitation, the imaging device 106 may be scanning a biological tissue section mounted on a slide, and the processor 102 may detect that the second consecutive image 122 is out of focus based on a drop in sharpness and contrast metrics. The processor 102 may then initiate a focus assessment routine to identify the probed focal plane 130, which is determined to lie 12 microns above the Z-plane position 150 used to capture the suboptimal 128 image. Continuing, the processor 102 may automatically update the Z-plane position 150 stored in the system's acquisition parameters by increasing it by 12 microns. This updated Z-plane position 150 may then be applied to one or more downstream image acquisition metrics, such as focus offset calibration, scan path planning, or adaptive exposure control, ensuring that subsequent images are captured at the corrected focal depth.

Still referring to FIG. 1, processor 102 is configured to initiate, using the at least an imaging device 106, a rescanning operation 152 of the second consecutive image 122 as a function of the probed focal plane 130. As used in this disclosure, a "rescanning operation" is a corrective image acquisition process initiated by the processor 102 in which a previously captured image is reacquired at the same lateral location 136 but at a revised Z-plane position 150 or under updated imaging parameters. In an embodiment, the previously captured image may include the suboptimal 128 image. In an embodiment, the rescanning operation 152 may be performed to improve image quality by realigning the imaging device 106 with the probed focal plane 130 or other adjusted conditions derived from prior quality analysis. For example, without limitation, if the processor 102 determines that the second consecutive image 122 is out of focus and identifies a probed focal plane 130 15 microns above the original Z-plane position 150, the processor 102 may initiate a rescanning operation 152 instructing the imaging device 106 to return to the same X-Y location 136 and capture a new image at the corrected Z-depth. In an embodiment, the rescanning operation 152 may also update associated parameters such as exposure time or gain, particularly if the quality deviation 140 involved multiple metrics. Without limitation, the rescanned image may replace the original suboptimal 128 image in the image set or be stored alongside it for comparison, annotation, or review.

With continued reference to FIG. 1, the at least a processor 102 may be further configured to display, using a graphical user interface 154 of a downstream device 156, a digital representation 158 of a modification 160 of the one or more metrics 124 associated with the at least an imaging device 106. A "graphical user interface," as used herein, is a graphical form of user interface that allows users to interact with electronic devices. In some embodiments, GUI 154 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 154. For example, links to decentralized platforms as described in this disclosure may be incorporated using icons. Using an icon may be a fast way to open documents, run programs etc. because clicking on them yields instant access.

With continued reference to FIG. 1, in an embodiment, the graphical user interface 154 and an event handler may operate together to enable seamless interaction between the user and the apparatus 100. The GUI 154 serves as the visual and interactive layer through which the user engages with the apparatus 100, presenting elements such as buttons, sliders, input fields, and informational displays. The event handler, on the other hand, functions as the underlying mechanism that monitors and responds to user interactions with the GUI 154. For example, when a user clicks a button on the GUI 154 to request an explanation of a concept, the event handler may detect the click event, identify its context, and trigger the appropriate processes within the apparatus 100 to generate a tailored response. This interplay may ensure dynamic and responsive system behavior, as the event handler processes various input events such as clicks, taps, keystrokes, or voice commands, and relays these inputs to the relevant system components. The GUI 154 subsequently updates to reflect the system's responses, such as displaying output, modifying visual elements, or providing real-time feedback. Together, the GUI 154 and event handler create an intuitive and interactive experience, bridging user actions and system functionality to achieve efficient and personalized outcomes.

With continued reference to FIG. 1, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device, and/or graphical user interface 154. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 1, in an embodiment, the apparatus 100 and or the downstream device 156 may include a data structure. As used in this disclosure, "data structure" is a way of organizing data represented in a specialized format on a computer configured such that the information can be effectively presented in a graphical user interface 154. In some cases, the data structure includes any input data. In some cases, the data structure contains data and/or rules used to visualize the graphical elements within a graphical user interface 154. In some cases, the data structure may include any data described in this disclosure. In some cases, the data structure may be configured to modify the graphical user interface 154, wherein data within the data structure may be represented visually by the graphical user interface 154. In some cases, the data structure may be continuously modified and/or updated by processor 102, wherein elements within graphical user interface 154 may be modified as a result. In some cases, processor 102 may be configured to transmit display device and or the downstream device 156 the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device, or another computing device. The data structure may serve as the organizational framework that stores, retrieves, and manages data required for processing events and updating the GUI 154. The data structure may act as a bridge between the user's input, captured by the event handler, and the output displayed on the GUI 154, ensuring that information is handled efficiently and accurately throughout the interaction. For example, without limitation, when a user interacts with a dropdown menu in the GUI 154 to select a topic, the event handler may capture this input and accesses a data structure. The data structure may retrieve the relevant information such as, text explanations, videos, or interactive exercises, and passes it back to the event handler, which may then trigger the appropriate updates to the GUI 154. In another embodiment, the data structure may also maintain the state of the system, tracking user progress, preferences, and session history. For instance, without limitation, a hash table may store user specific configurations which the event handler references when processing interactions. The GUI 154 may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface 154 (GUI) that allows users to perform actions, provide input, or engage with the apparatus 100. Interactive elements may be designed to facilitate two-way communication between the user and the system, enabling the user to influence the behavior of the apparatus or obtain feedback 162 in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JAVASCRIPT® may enable dynamic functionality. For example, without limitation, JAVASCRIPT® may detect when the user clicks a button and trigger actions or animations. Front-end frameworks like REACT®, ANGULAR®, or VUE.JS™ may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like PYTHON®, JAVA®, or NODE.JS®, may handle input processing and return relevant data. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MYSQL® or MONGODB®, may manage and store the data required for interactive features, such as user profiles or historical activity. Communication technologies may also help maintain the responsiveness of interactive elements. AJAX® (Asynchronous JAVASCRIPT® and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus 100 may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses, facilitating seamless integration and functionality across diverse systems.

With continued reference to FIG. 1, as used in this disclosure, "downstream device" is a device that accesses and interacts with apparatus 100. For instance, and without limitation, downstream device 156 may include a remote device and/or apparatus 100. In a non-limiting embodiment, downstream device 156 may be consistent with a computing device as described in the entirety of this disclosure. Without limitation, the downstream device 156 may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user interface (GUI) 154 to a user, wherein a user may interact with a GUI 154. In some cases, a user may view a GUI 154 through display. Additionally, or alternatively, processor 102 be connected to display device. In one or more embodiments, transmitting the digital representation 158 may include displaying the digital representation 158 at display device using a visual interface.

With continued reference to FIG. 1, as used in this disclosure, a "digital representation" is a computer-generated visualization of data. In an embodiment, the digital representation 158 may include a rendering and/or symbolic depiction of parameters and/or system states. In an embodiment, the digital representation 158 may be displayed on a graphical user interface 154. The digital representation 158 may be presented in various formats, including numerical values, graphs, sliders, icons, overlays, or interactive controls, and may be used to communicate real-time or historical information about the imaging process. For example, without limitation, the digital representation 158 may include a bar graph showing the change in sharpness score before and after focal adjustment, or a slider control displaying the current Z-plane position 150 with the ability for a user to review suggested modifications. In an embodiment, the digital representation 158 may be a visual overlay on the image itself that indicates areas with excessive noise or suboptimal 128 focus using color-coded markers. As used in this disclosure, a "modification" is an adjustment made to one or more metrics 124 associated with the imaging device 106. The modification 160 may be made to improve image quality or performance of the apparatus 100. Without limitation, the modification 160 may be initiated automatically by the processor 102 or manually by a user through the graphical user interface 154, and it may relate to positional, optical, or acquisition-related settings. For example, without limitation, the modification 160 may include shifting the Z-plane position 150 upward by 12 microns to align with a newly identified probed focal plane 130. In an embodiment, a modification 160 may involve decreasing exposure time to prevent over-saturation or adjusting a sharpness threshold used to determine focus acceptance. Without limitation, the processor 102 may generate and display the digital representation 158 of such modifications in real time to enable user review, feedback 162, or confirmation. Without limitation, FIG. 10 may depict the digital representation 158.

With continued reference to FIG. 1, the at least a processor 102 may be further configured to receive, using the graphical user interface 154, feedback 162 associated with the modification 160 of the one or more metrics 124. As used in this disclosure, "feedback" is input received from a user. In an embodiment, the feedback 162 may be submitted by the user through a graphical user interface 154 that provides a response, confirmation, correction, or adjustment related to a system-generated or proposed modification. The feedback 162 may include accepting, rejecting, or modifying system recommendations, manually adjusting parameters, or annotating observations. Feedback 162 may be used to refine imaging settings, guide system learning, or confirm the validity of automated actions. For example, without limitation, after the processor 102 displays a digital representation 158 of a recommended Z-plane adjustment based on the probed focal plane 130, the graphical user interface 154 may present the user with options to confirm or revise the adjustment. A user may accept the modification 160, prompting the system to apply the new Z-plane position 150 for subsequent scans, or reject it and manually input a preferred value. In an embodiment, the feedback 162 may include fine-tuning additional parameters, such as adjusting the sharpness threshold, modifying brightness compensation, or changing the noise tolerance level. Without limitation, the feedback 162 may be recorded and used to train machine learning models 166 that predict optimal metric adjustments in future cases, or to adapt system behavior to user preferences or sample-specific characteristics.

With continued reference to FIG. 1, the at least a processor 102 may be further configured to identify, using a Z-probing model 164, the probed focal plane 130, wherein the Z-probing model 164 may include a machine learning model 166, the machine learning model 166 trained using a training dataset 168, wherein the training dataset 168 comprises historical consecutive images 170 associated with historical probed focal plane 172. As used in this disclosure, a "Z-probing model" is a machine learning model 166 configured to identify or predict the optimal focal plane along the Z-axis based on analysis of one or more images captured at varying depths. The Z-probing model 164 may receive as input a plurality of probed images 132 or image metrics 118 and may output a predicted Z-plane position 150 that corresponds to the highest expected image quality. The Z-probing model 164 may be deployed by the processor 102 to automate or enhance the focus assessment routine. As used in this disclosure, a "training dataset" is a curated collection of data used to develop and optimize a machine learning model 166. The training dataset 168 may include input features, such as pixel values, sharpness scores, or metadata, and ground-truth labels, such as manually verified focal planes. The training dataset 168 may be annotated, preprocessed, and structured to ensure that the Z-probing model 164 can generalize across varying sample 116 types, imaging conditions, and slide configurations. As used in this disclosure, "historical consecutive images" are previously acquired image sequences collected by the imaging device 106 over time that represent real-world examples of biological samples 116 scanned during prior operations. Each image in a set of historical consecutive images 170 may be labeled with associated metadata, including capture position, image quality metrics, and scan parameters. As used in this disclosure, a "historical probed focal plane" is a previously determined Z-plane position 150 that was identified as optimal for a given image location 136 during a prior scanning session. The historical probed focal plane 172 may have been established through manual annotation, automated sharpness scoring, or a prior version of a focus assessment routine, and may be stored alongside the corresponding image sequence in the training dataset 168. In an embodiment, the Z-probing model 164 may be trained using a supervised learning framework. The training dataset 168 may consist of labeled pairs comprising historical consecutive images 170 and their corresponding historical probed focal planes 172. Each training instance may include a stack of images acquired at different Z-depths, along with the Z-coordinate identified as the optimal focus for that region. For example, without limitation, the processor 102 may extract features from each image in the Z-stack, such as edge density, brightness variation, or frequency-domain content, and input them into the machine learning model 166. The machine learning model 166 may learn to associate patterns in these features with the correct focal plane. The training process may involve iterative optimization of model parameters using a loss function that penalizes incorrect focal predictions. In an embodiment, the model may be validated using a separate set of annotated images to assess generalization performance and prevent overfitting. Once trained, the Z-probing model 164 may be deployed during live imaging sessions to predict the optimal focal plane in real time, improving scanning speed and accuracy, particularly in regions of the sample 116 that exhibit structural variability or mounting inconsistencies. In an embodiment, the training process for the Z-probing model 164 may be structured as an iterative optimization procedure in which the model parameters, such as convolutional kernel weights or decision boundaries, are progressively refined through repeated exposure to training data. During each iteration, the machine learning model 166 may receive as input a Z-stack of consecutive images with corresponding labels that indicate the correct focal plane. The apparatus 100 may compute a loss function, which is a numerical measure of how far the model's predicted focal plane deviates from the known or annotated probed focal plane 130. For example, without limitation, the loss function may penalize larger Z-offset errors more severely, encouraging the model to minimize the distance between the predicted and actual focus depth. In some embodiments, the loss function may incorporate both positional error and focus quality mismatch, allowing the machine learning model 166 to balance precision with confidence in focus accuracy. In an embodiment, to ensure the machine learning model 166 does not merely memorize the training dataset 168, a validation phase may be conducted in parallel. In an embodiment, the processor 102 may reserve a subset of annotated Z-stacks as a validation dataset, which is not used for training but is instead evaluated periodically to measure generalization performance. Without limitation, this may help identify overfitting, where the model performs well on known data but poorly on unseen examples, and may ensure that the Z-probing model 164 can reliably predict focal planes across diverse tissue types, imaging conditions, and sample 116 geometries. Once training has converged and validation performance meets or exceeds predefined thresholds, the machine learning model 166 may be deployed in a live imaging environment. For example, without limitation, the trained Z-probing model 164 may be integrated into a scanning workflow, where it receives incoming Z-stacks in real time and outputs a predicted focal plane for each field of view. In an embodiment, the machine learning model 166 may guide the imaging device 106 to immediately adjust its Z-position based on the predicted optimal focal depth, thereby reducing the need for repeated scans and accelerating overall throughput. Without limitation, the real-time deployment of the trained machine learning model 166 may be especially beneficial in regions of the biological sample 116 where physical variations, such as tissue folds, coverslip tilt, or mounting inconsistencies, create frequent deviations in the focal plane. The Z-probing model 164 may enable the apparatus 100 to dynamically compensate for these deviations, resulting in sharper, more diagnostically useful images without requiring constant manual oversight. In an embodiment, the Z-probing model 164 may be trained using artificially generated Z-stacks created from digital phantoms, simulated representations of biological tissue with known structural patterns and ground-truth focal planes. The apparatus 100 may render synthetic images at various Z-depths by simulating optical blur, noise profiles, and intensity fall-off characteristics. Without limitation, these synthetic stacks may be designed to resemble a wide range of tissue types, mounting artifacts, and staining conditions, enabling the model to learn from edge cases not yet observed in clinical data. In an embodiment, the system may leverage pre-trained computer vision models originally developed for general image focus detection and fine-tune them using domain-specific medical imaging datasets. Without limitation, the base model may be trained on public datasets of natural scenes with labeled focus annotations, and later adapted to histological or cytological images using a smaller volume of medical examples, reducing the need for extensive medical annotations.

With continued reference to FIG. 1, in an embodiment, apparatus 100 may enable inline correction of suboptimal images, which may represent an improvement over conventional workflows that typically rely on post-scan analysis to detect out-of-focus regions. In an embodiment, by assessing image quality during the scan, rather than after acquisition, apparatus 100 may eliminate delays associated with retrospective error identification and may allow for immediate correction. This may lead to an improvement in scanning efficiency by reducing the likelihood of redundant rescanning and minimizing operator input. In an embodiment, apparatus 100 may further contribute to improved image quality by dynamically validating and adjusting the Z-plane focus during live image capture, helping to ensure that each image meets one or more quality thresholds. Additionally and/or alternatively, apparatus 100 may incorporate intelligent focus decision-making logic, which may reduce false triggering caused by artifacts such as debris, bubbles, or surface inconsistencies. Collectively, these features may result in substantial improvements in imaging accuracy, speed, and workflow reliability.

With continued reference to FIG. 1, in an embodiment, apparatus 100 may include an inline, intelligent focus recovery module. This module may be configured to dynamically detect and correct out-of-focus conditions as the scanning process is underway. By enabling correction in real time, apparatus 100 may eliminate the need to wait for post-scan reviews to identify and address image quality issues. This inline correction may result in more efficient workflows and greater reliability in data acquisition. In an embodiment, apparatus 100 may include real-time monitoring capabilities for focus-related metrics. These metrics may include, without limitation, sharpness, Z-drift, or temporal stability of focal quality across a series of scanned fields of view. Monitoring may be performed continuously, allowing the system to evaluate image clarity and structural fidelity without introducing delays or relying on downstream image processing. In an embodiment, apparatus 100 may be configured to detect consecutive out-of-focus fields of view captured at high magnification. For example, without limitation, the magnification range may include 20×, 40×, or even 100× objective lenses. Because higher magnification levels have narrower depth of field, even minor deviations from the correct focal plane may result in pronounced image degradation. Apparatus 100 may automatically identify these instances inline during scanning, ensuring that suboptimal frames are recognized before further processing or analysis. In an embodiment, apparatus 100 may further include an adaptive Z-probing algorithm that may identify the correct focal plane. This algorithm may analyze probed images captured at multiple depths to distinguish between focal planes such as the sample plane, the surface of the cover slip, or unwanted surfaces such as debris. For example, without limitation, the algorithm may use sharpness scores or signal contrast to determine the most probable in-focus region, thereby improving precision in adjusting focal settings. In an embodiment, apparatus 100 may include trigger logic that governs whether a rescanning operation should be initiated. This logic may incorporate a confidence score based on the clarity, consistency, and reproducibility of image metrics. The trigger may only activate when the calculated confidence score exceeds a predefined threshold, indicating a high likelihood that the observed focus deviation is genuine rather than noise or temporary artifact. In an embodiment, apparatus 100 may also include decision-making logic designed to prevent false-positive triggers. For example, without limitation, artifacts such as pen marks, staining irregularities, or air bubbles may superficially resemble out-of-focus regions. Apparatus 100 may use contextual image features, texture analysis, or comparison with adjacent frames to differentiate these superficial artifacts from actual focus deviations. Apparatus 100 may use contextual image features by analyzing the surrounding content within a field of view to determine whether a blurry region is consistent with expected biological structures or is likely caused by a superficial artifact. For instance, when an out-of-focus area is surrounded by high-frequency textures indicative of cellular structures, the system may infer a genuine focal deviation. Conversely, if the blurry region has uniform intensity or irregular borders not typical of biological samples, the apparatus 100 may classify it as a likely artifact. Apparatus 100 may further employ texture analysis techniques such as Local Binary Patterns (LBP), Haralick features, or Gabor filters to quantify and compare texture characteristics across the image. As used in this disclosure, "Local Binary Patterns (LBP)" is a texture descriptor that compares each pixel in a grayscale image to its surrounding pixels in a defined neighborhood. For each neighboring pixel, a binary value is assigned depending on whether its intensity is greater or less than the center pixel. The resulting binary pattern is then converted into a decimal number, creating a unique label for that texture region. LBP may be used to quantify local texture variations and is particularly useful for identifying repetitive structures or anomalies in biological tissue images. As used in this disclosure, "Haralick features" are statistical descriptors derived from the gray-level co-occurrence matrix (GLCM), which captures the spatial relationships between pixel intensities in an image. These features may include metrics such as contrast, correlation, energy, and homogeneity, among others. Haralick features may be used to describe textural properties over a region and are often effective in distinguishing structured tissue from noise, artifacts, or background regions. As used in this disclosure, "Gabor filters" are linear filters used for edge and texture analysis by isolating specific frequency and orientation components of an image. A Gabor filter may respond strongly to image regions with similar frequency content and orientation, making it well-suited for detecting directional textures or repetitive patterns. When applied to biological images, Gabor filters may help identify oriented structures such as elongated cells or fibrous tissue, while also helping to differentiate such features from artifacts with non-directional signatures. Artifacts like pen marks or stain blobs may display texture signatures that are abrupt, repetitive, or isotropic, unlike the anisotropic textures of tissue or cellular structures. These patterns may be used as discriminative features in a classification model or rule-based algorithm to determine artifact presence. Additionally and/or alternatively, apparatus 100 may compare the suspect region with adjacent frames captured before and after the current field of view. A true focus deviation is likely to persist across sequential images if the slide's topography or mounting was compromised. In contrast, an isolated blur seen only in one frame but not in surrounding fields may signal a transient visual anomaly such as debris or surface smudge. Through this temporal consistency check, apparatus 100 may improve the reliability of its detection and reduce the likelihood of triggering a rescanning operation unnecessarily. The intelligent filtering may improve scanning accuracy and reduce unnecessary rescans, contributing to more efficient and reliable imaging sessions.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
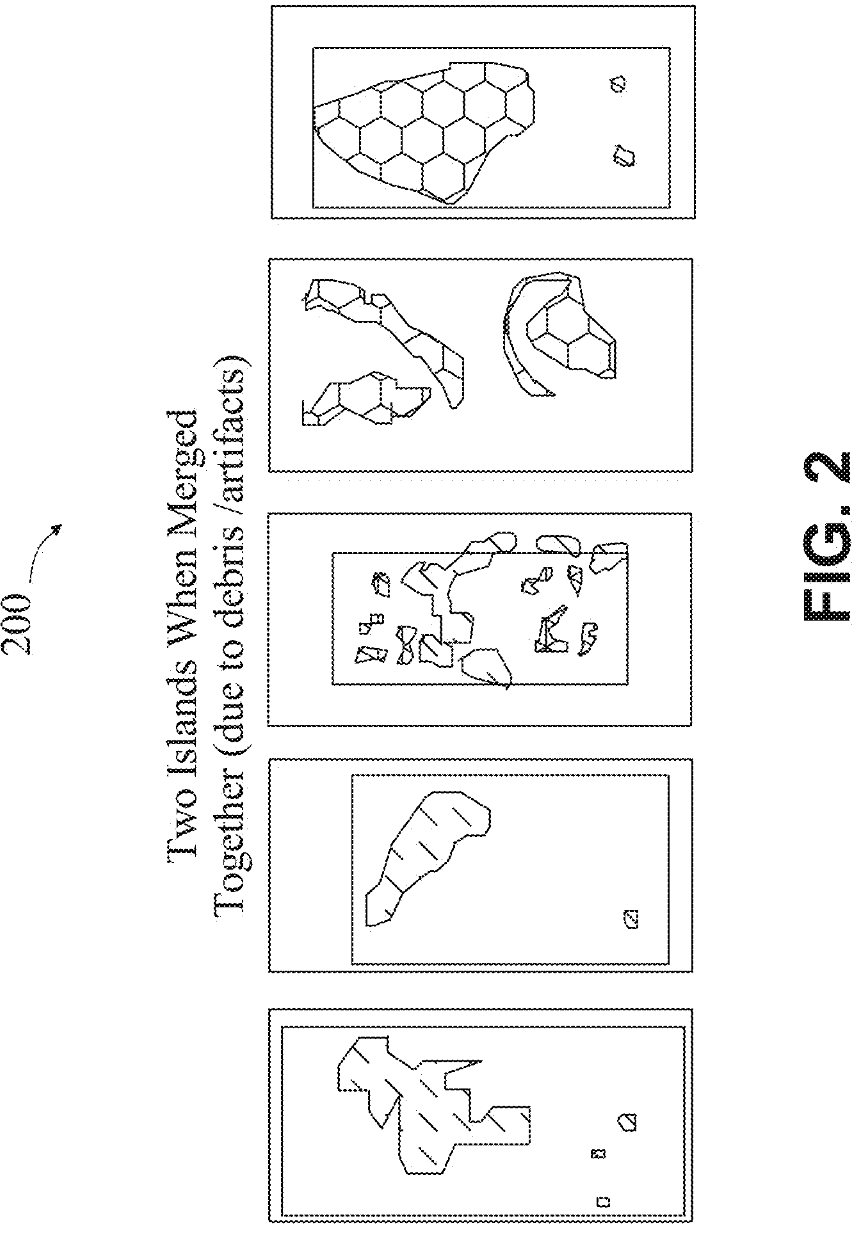
FIG. 2 is an illustration of a plurality of images scanned on a Z-plane.

Referring now to FIG. 2, an illustration 200 of a plurality of images scanned on a Z-plane. In an embodiment, the illustration 200 may highlight the effect of imaging depth on biological sample visualization, including complications arising when multiple tissue islands merge due to debris or mounting artifacts.

Figure 3:
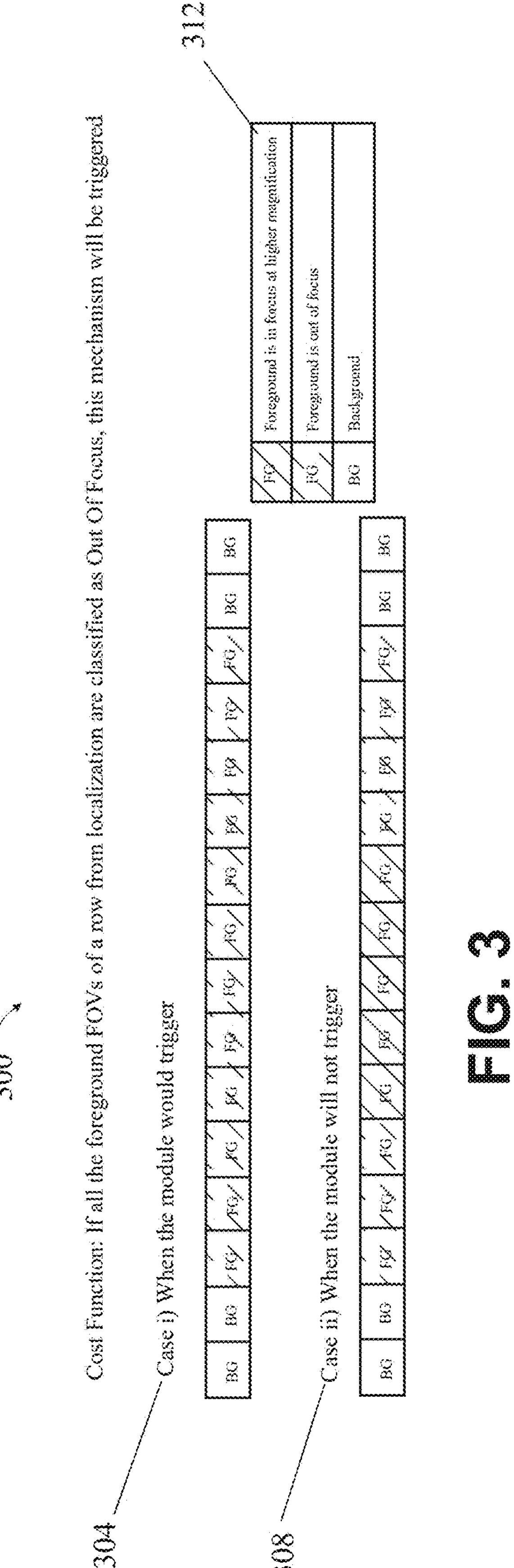
FIG. 3 is an illustration of a scale when a rescanning operation is triggered and when the rescanning operation is not triggered by an apparatus.

Referring now to FIG. 3, an illustration 300 of a scale when a rescanning operation is triggered and when the rescanning operation is not triggered by an apparatus. For example, without limitation, the illustration 300 may compare a first case 304 where all images in a given scan region fall below quality standards, and a second case 308 where only partial degradation is detected. For instance, if three out of five consecutive fields of view are labeled as suboptimal, the system may be configured to initiate a targeted re-probing rather than a full re-scan. The scale may also incorporate decision logic that weighs scanning costs against image utility. In an embodiment, the illustration 300 may include a legend 312. The legend 312 may include three patterns representing three classification as described herein.

Figure 4:
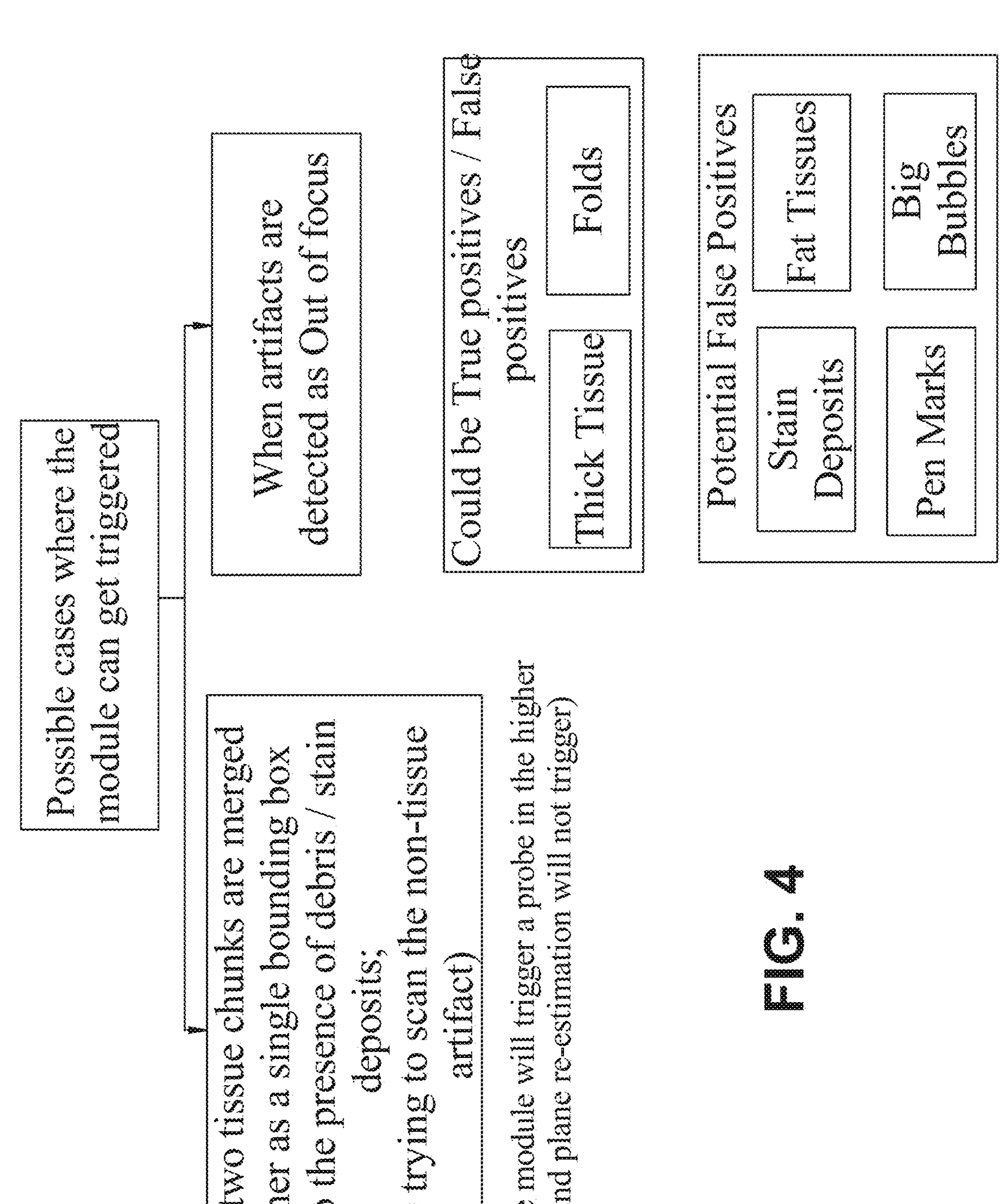
FIG. 4 is a diagram of possible cases when the rescanning operation is triggered by an apparatus.

Referring now to FIG. 4, a diagram 400 of possible cases when the rescanning operation is triggered by an apparatus. In an embodiment, the diagram 400 may include categories such as tissue folds, stain pooling, pen ink contamination, and bubble interference. Each case may present a different probability of suboptimal focus or measurement bias, and the system may use predefined heuristics or AI classification to decide whether corrective action such as Z-stack acquisition or focal re-alignment is necessary.

Figure 5:
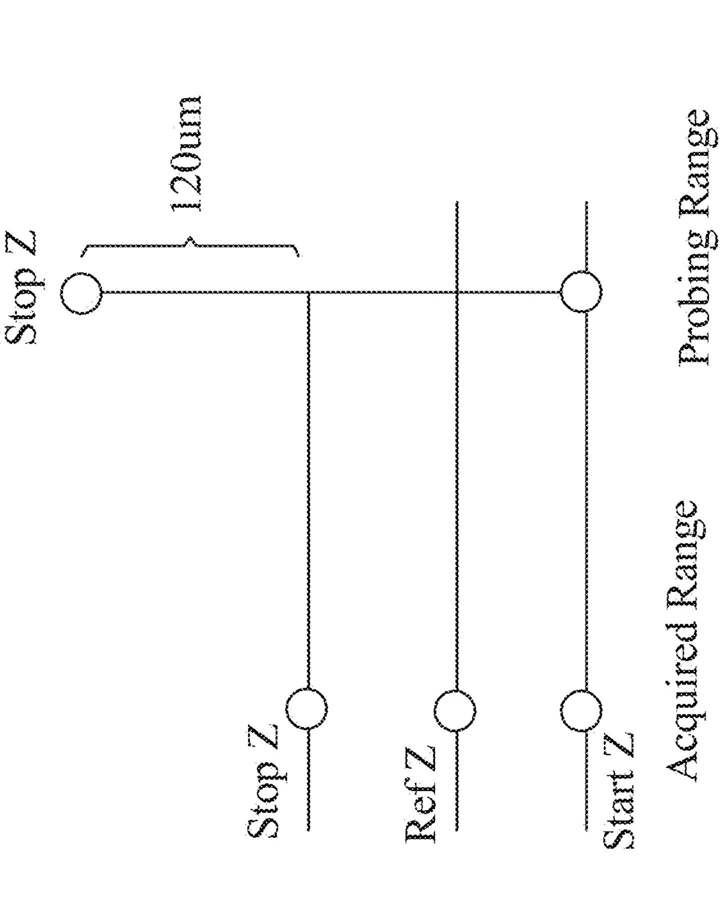
FIG. 5 is an illustration of a Z-axis reference and stack range estimation process.

Referring now to FIG. 5, an illustration 500 of a Z-axis reference and stack range estimation process. In an embodiment, the illustration 500 may include how the system defines the start and stop boundaries of a Z-stack and selects a reference Z value for best focus. In an embodiment, this illustration may also include arrows indicating direction of movement and shaded areas representing estimated tissue thickness. The processor may then use this visual data to refine the focal probing range and eliminate redundant scanning steps while ensuring optimal image sharpness.

Figure 6:
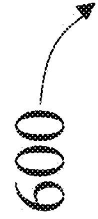
FIG. 6 is an illustration of a Z-plane classification.

Referring now to FIG. 6, an illustration 600 of a Z-plane classification. The illustration 600 may display how different focal planes are labeled according to their deviation from an ideal focus reference. Categories may include "higher than reference," "lower than reference," or "at reference level." This classification may allow the apparatus to infer whether the image plane needs to be shifted up or down. For example, without limitation, if multiple consecutive fields are consistently classified as "higher," the system may infer that the scanning stage is set too deep and adjust the Z-plane accordingly.

Referring now to FIG. 7, an illustration 700 of a Z-plane classification breakdown. Without limitation, the illustration 700 may associate specific Z-deviation patterns with root causes such as microbubbles trapped under the coverslip, thick multi-layer tissue regions, or abrupt plane shifts from fold lines. Each condition may trigger a different system response, including adjusting scan paths, applying customized thresholds, or logging the region for post-processing review. In an embodiment, the illustration 700 may annotate which events are automatically correctable versus which require manual review.

Figure 8:
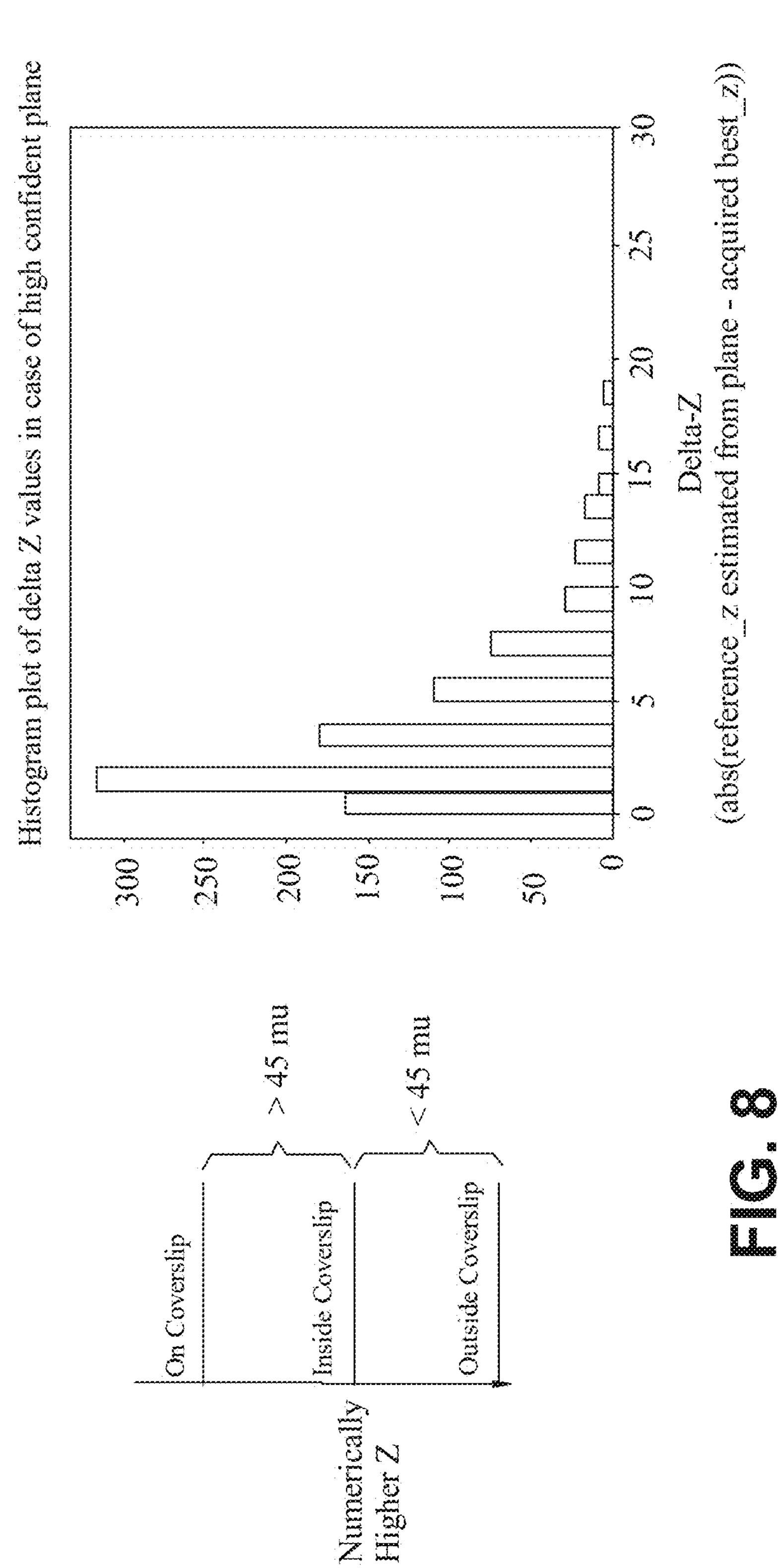
FIG. 8 is an illustration of a histogram plot of deviation values in the Z-plane direction.

Referring now to FIG. 8, an illustration 800 of a histogram plot of deviation values in the Z-plane direction. In an embodiment, each bar in the histogram may correspond to a range of deviation between the estimated best focus (Z-best) and the system's predefined reference Z value. A tall cluster near zero may indicate uniform flat tissue, while a wide spread may suggest topological inconsistencies or sample mounting errors. The processor may use this histogram in real time to adjust focus logic or to trigger rescanning in anomalous regions.

Referring now to FIG. 9, an illustration 900 of a Z-difference based stack range estimation process. In an embodiment, the illustration 900 may include labeled regions corresponding to specific deviation ranges, such as 0-20 microns (normal), 20-45 microns (marginal), and greater than 45 microns (outlier). Each zone may include a decision box that describes how the system handles deviations falling into that range. For instance, a 15-micron difference may be ignored, whereas a 65-micron deviation may initiate full grid rescanning. The illustration may help convey how adaptive thresholds and historical data inform real-time scanning logic.

Figure 10:
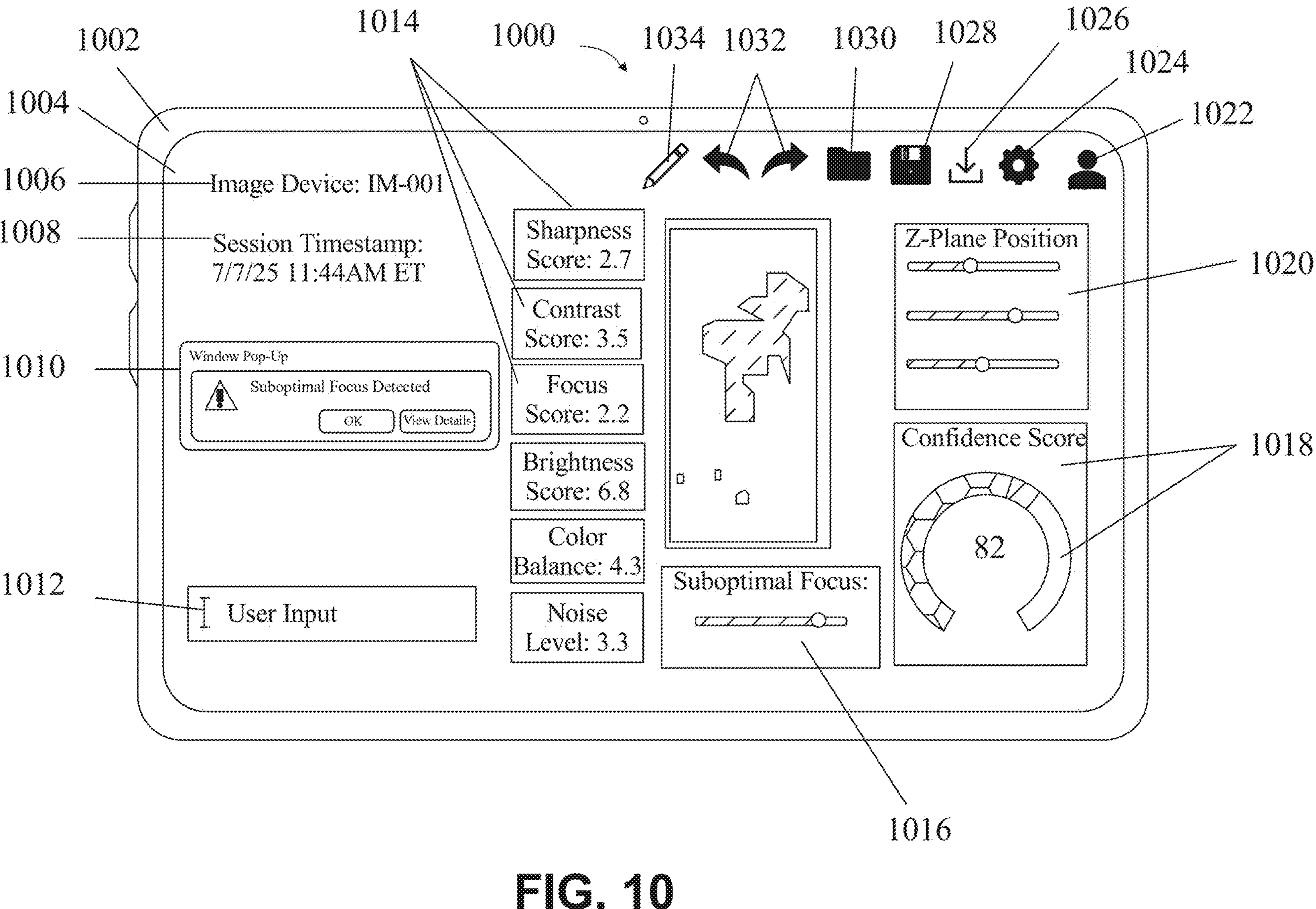
FIG. 10 is an exemplary illustration of a graphical user interface displaying a digital representation.

Referring now to FIG. 10, an illustration 1000 of a graphical user interface displaying a digital representation. In an embodiment, the illustration 1000 may include a downstream device 1002. In an embodiment, downstream device 1002 may include a computing or display device that receives output data from the processor and presents it to a user, operator, or control system. The downstream device 1002 may include, without limitation, a monitor, tablet, workstation, or touchscreen interface configured to display imaging data, system metrics, or interactive controls. In an embodiment, the downstream device 1002 may include a graphical user interface 1004. Without limitation, the graphical user interface may include a digital display layer rendered on the downstream device 1002 that presents system-generated data and controls to the user in an interactive format. The graphical user interface 1004 may include visualizations, indicators, input fields, notifications, and other elements that enable the user to view, evaluate, or modify imaging-related data or system parameters.

In an embodiment, the graphical user interface 1004 may include an image device identifier 1006. As used in this disclosure, an "image device identifier" is a label, name, or unique reference code displayed on the graphical user interface 1004 that identifies the imaging device from which the image data or metrics originated. The image device identifier 1006 may include information such as device serial number, model type, assigned imaging lane, and the like.

In an embodiment, the graphical user interface 1004 may include a timestamp 1008. As used in this disclosure, a "timestamp" is a temporal marker associated with an image capture event, metric calculation, or system-generated action, displayed on the graphical user interface 1004. The timestamp 1008 may include the date and time of image acquisition or metric generation and may be used to track system events, correlate data, or establish audit trails.

In an embodiment, the graphical user interface 1004 may include a notification 1010. As used in this disclosure, a "notification" is an alert presented on the graphical user interface 1004 that communicates system status, warnings, or recommendations to the user. The notification 1010 may include indicators such as suboptimal image detection, metric deviations, or successful focal adjustments, and may be visually coded using icons, colors, or priority levels. In an embodiment, the graphical user interface 1004 may include a user input field 1012. As used in this disclosure, a "user input field" is an interactive area of the graphical user interface 1004 that enables the user to enter data, provide feedback, confirm system actions, or modify parameters. The user input field 1012 may accept text, selections, numerical values, or other forms of input relevant to image evaluation or system control. In an embodiment, the graphical user interface 1004 may include least a metric 1014. The at least a metric may represent an aspect of image quality or imaging device performance. The metric 1014 may include, without limitation, sharpness scores, contrast levels, Z-plane offsets, focus confidence scores, or noise estimates used to guide decision-making or confirm image adequacy. In an embodiment, the graphical user interface 1004 may include a suboptimal focus degree 1016. As used in this disclosure, a "suboptimal focus degree" is an indicator displayed on the graphical user interface 1004 that quantifies the extent to which a given image deviates from optimal focus. The suboptimal focus degree 1016 may be derived from image metrics such as sharpness, contrast, or Z-offset and may be used to prioritize images for rescanning or user review. In an embodiment, the graphical user interface 1004 may include a confidence score 1018. The confidence score may include a value displayed on the graphical user interface 1004 that reflects the level of certainty associated with a system-determined focal plane or imaging decision. The confidence score 1018 may be calculated by a machine learning model 166 or algorithmic estimator and may be expressed as a percentage or normalized value. In an embodiment, the graphical user interface 1004 may include a Z-plane position 1020. The Z-plane position 1020 may include the axial depth coordinate displayed on the graphical user interface 1004 that corresponds to the current or proposed focal plane used by the imaging device. The Z-plane position 1020 may be expressed in microns or motor steps and may assist the user in assessing or adjusting focus location. In an embodiment, the graphical user interface 1004 may include a profile icon 1022. As used in this disclosure, a "profile icon" is a graphical symbol displayed on the graphical user interface 1004 that allows access to user account information, preferences, or session data. The profile icon 1022 may be used to identify the active user and manage user-specific settings or permissions. In an embodiment, the graphical user interface 1004 may include a settings icon 1024. As used in this disclosure, a "settings icon" is a user-selectable graphical control on the graphical user interface 1004 that provides access to system configuration options, including imaging preferences, display settings, and metric thresholds. In an embodiment, the graphical user interface 1004 may include a download icon 1026. As used in this disclosure, a "download icon" is a control element on the graphical user interface 1004 that enables the user to export image data, metric values, or reports from the downstream device to local or network storage. In an embodiment, the graphical user interface 1004 may include save icon 1028. As used in this disclosure, a "save icon" is a graphical button or symbol presented on the graphical user interface 1004 that allows the user to manually save current data, parameter changes, or system outputs to memory or file. In an embodiment, the graphical user interface 1004 may include an open icon 1030. As used in this disclosure, an "open icon" is a user-interactive graphical element on the graphical user interface 1004 that enables access to previously stored data, such as saved images, scanned regions, or configuration profiles. In an embodiment, the graphical user interface 1004 may include redo/undo button 1032. As used in this disclosure, a "redo/undo button" is a graphical control on the graphical user interface 1004 that allows the user to reverse or reapply recent actions or modifications performed during interaction with the system. In an embodiment, the graphical user interface 1004 may include an edit icon 1034. As used in this disclosure, an "edit icon" is a user-selectable element on the graphical user interface 1004 that enables manual adjustment or annotation of displayed data. Display data may include image metrics, focus positions, or system-generated recommendations.

With continued reference to FIG. 10, in an embodiment, the digital representation described in FIG. 1 may be visually displayed on the graphical user interface 1004 of the downstream device 1002 in the form of one or more updated interface elements that reflect a modification to a metric associated with the imaging device. For example, without limitation, the Z-plane position 1020 may be updated to show a revised focal depth following the identification of a new probed focal plane, providing a real-time display of the adjusted focus location. In an embodiment, the suboptimal focus degree 1016 may be presented alongside the updated confidence score 1018, illustrating the degree of improvement in image quality following the metric adjustment. Without limitation, the at least a metric 1014 may be modified and displayed to represent recalculated sharpness, contrast, or noise values resulting from system-triggered or user-approved corrections. Without limitation, these elements collectively may serve as the digital representation of the modification, allowing the user to view, assess, or further interact with the changes made to the imaging parameters.

Figure 11:
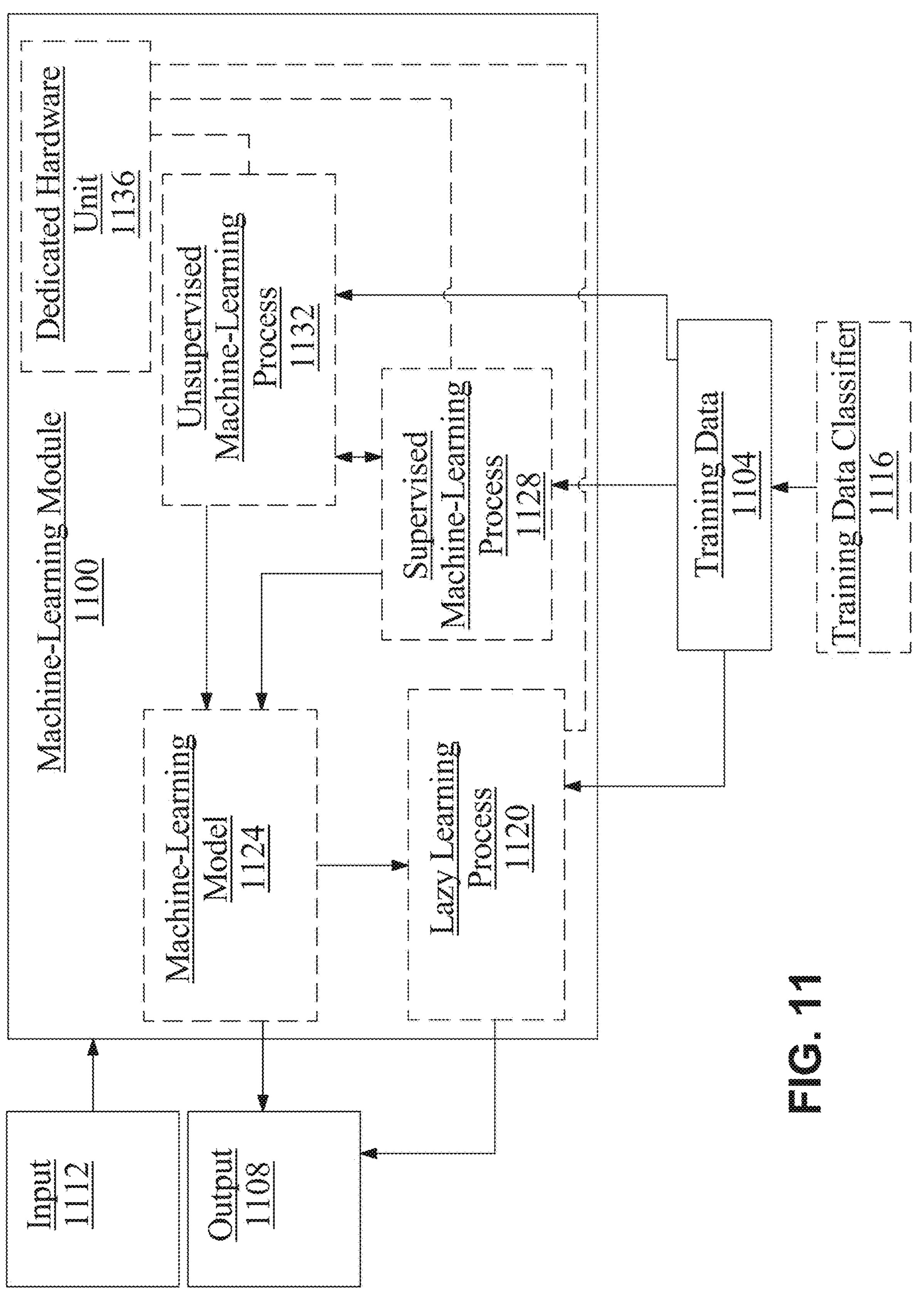
FIG. 11 is a block diagram of an exemplary machine-learning process.

Referring now to FIG. 11, an exemplary embodiment of a machine-learning module 1100 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1104 to generate an algorithm instantiated in hardware or software logic, data structures, and/or functions that will be performed by a computing device/module to produce outputs 1108 given data provided as inputs 1112; this is in contrast to a non-machine learning software program where the commands to be executed are determined in advance by a user and written in a programming language.

Still referring to FIG. 11, "training data," as used herein, is data containing correlations that a machine-learning process may use to model relationships between two or more categories of data elements. For instance, and without limitation, training data 1104 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 1104 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1104 according to various correlations; correlations may indicate causative and/or predictive links between categories of data elements, which may be modeled as relationships such as mathematical relationships by machine-learning processes as described in further detail below. Training data 1104 may be formatted and/or organized by categories of data elements, for instance by associating data elements with one or more descriptors corresponding to categories of data elements. As a non-limiting example, training data 1104 may include data entered in standardized forms by persons or processes, such that entry of a given data element in a given field in a form may be mapped to one or more descriptors of categories. Elements in training data 1104 may be linked to descriptors of categories by tags, tokens, or other data elements; for instance, and without limitation, training data 1104 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 11, training data 1104 may include one or more elements that are not categorized; that is, training data 1104 may not be formatted or contain descriptors for some elements of data. Machine-learning algorithms and/or other processes may sort training data 1104 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1104 to be made applicable for two or more distinct machine-learning algorithms as described in further detail below. Training data 1104 used by machine-learning module 1100 may correlate any input data as described in this disclosure to any output data as described in this disclosure. As a non-limiting illustrative example, the input data may include a plurality of probed images captured at different Z-plane positions along with associated image metrics such as sharpness scores, contrast values, and noise estimates. The output data may include a predicted probed focal plane corresponding to the Z-position with the highest expected image quality, as well as a confidence score indicating the certainty of the prediction. In an embodiment, the input data may further include metadata such as sample type, scan location, or historical image quality deviation, and the output may include adaptive imaging parameters for use in a subsequent rescanning operation.

Further referring to FIG. 11, training data may be filtered, sorted, and/or selected using one or more supervised and/or unsupervised machine-learning processes and/or models as described in further detail below; such models may include without limitation a training data classifier 1116. Training data classifier 1116 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 1100 may generate a classifier using a classification algorithm, defined as a processes whereby a computing device and/or any module and/or component operating thereon derives a classifier from training data 1104. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to distinct focal quality categories, such as high-confidence focal planes, ambiguous focus regions, or consistently misaligned Z-plane predictions, for which a subset of training data may be selected. In an embodiment, the classifier may label image stacks based on sample characteristics, such as tissue type, staining method, or slide thickness, allowing the machine-learning module to be trained or fine-tuned on sub-populations that exhibit similar optical properties or focus variability.

Still referring to FIG. 11, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 11, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 11, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 11, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 11, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 11, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 11, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 11, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 11, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 11, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 11, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 11, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 11, machine-learning module 1100 may be configured to perform a lazy-learning process 1120 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1104. Heuristic may include selecting some number of highest-ranking associations and/or training data 1104 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 11, machine-learning processes as described in this disclosure may be used to generate machine-learning models 1124. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 1124 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1124 may be generated by creating an artificial neural network, such as a convolutional neural network comprising an input layer of nodes, one or more intermediate layers, and an output layer of nodes. Connections between nodes may be created via the process of "training" the network, in which elements from a training data 1104 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 11, machine-learning algorithms may include at least a supervised machine-learning process 1128. At least a supervised machine-learning process 1128, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include, as inputs, a plurality of probed images captured at sequential Z-plane positions, along with associated image metrics such as sharpness scores, brightness distributions, and noise levels as described above, and may include, as outputs, the corresponding probed focal plane identified for each image stack and a confidence score indicating the reliability of the focal plane determination, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1104. Persons skilled in the art, upon reviewing the entirety of this disclosure, will be aware of various possible variations of at least a supervised machine-learning process 1128 that may be used to determine relation between inputs and outputs. Supervised machine-learning processes may include classification algorithms as defined above.

With further reference to FIG. 11, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 11, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 11, machine learning processes may include at least an unsupervised machine-learning processes 1132. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 1132 may not require a response variable; unsupervised processes 1132 may be used to find interesting patterns and/or inferences between variables, to determine a degree of correlation between two or more variables, or the like.

Still referring to FIG. 11, machine-learning module 1100 may be designed and configured to create a machine-learning model 1124 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 11, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 11, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 11, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 11, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 11, one or more processes or algorithms described above may be performed by at least a dedicated hardware unit 1136. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 1136 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 1136 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 1136 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 12:
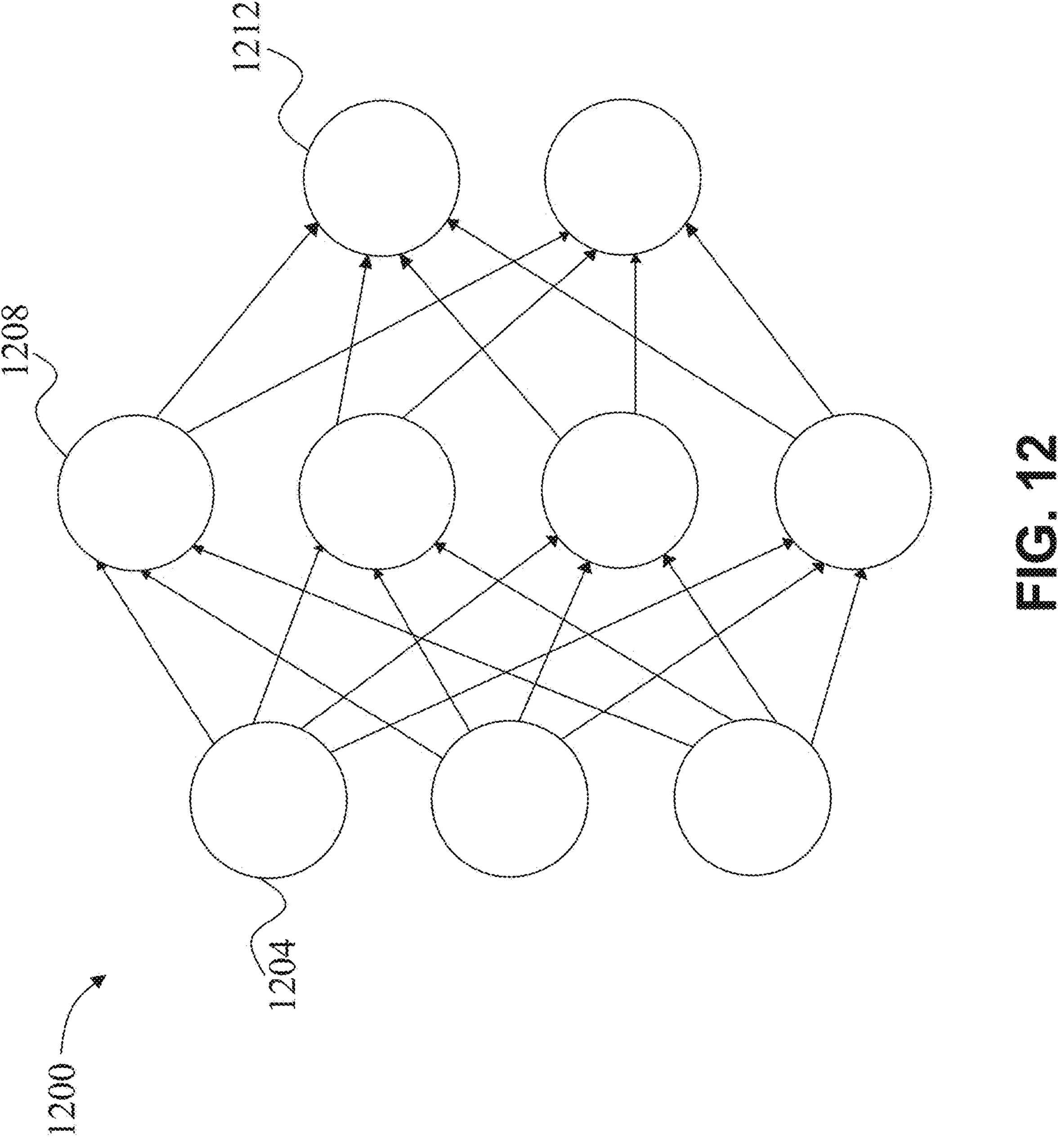
FIG. 12 is a diagram of an exemplary embodiment of a neural network.

Referring now to FIG. 12, an exemplary embodiment of neural network 1200 is illustrated. A neural network 1200 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 1204, one or more intermediate layers 1208, and an output layer of nodes 1212. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 13:
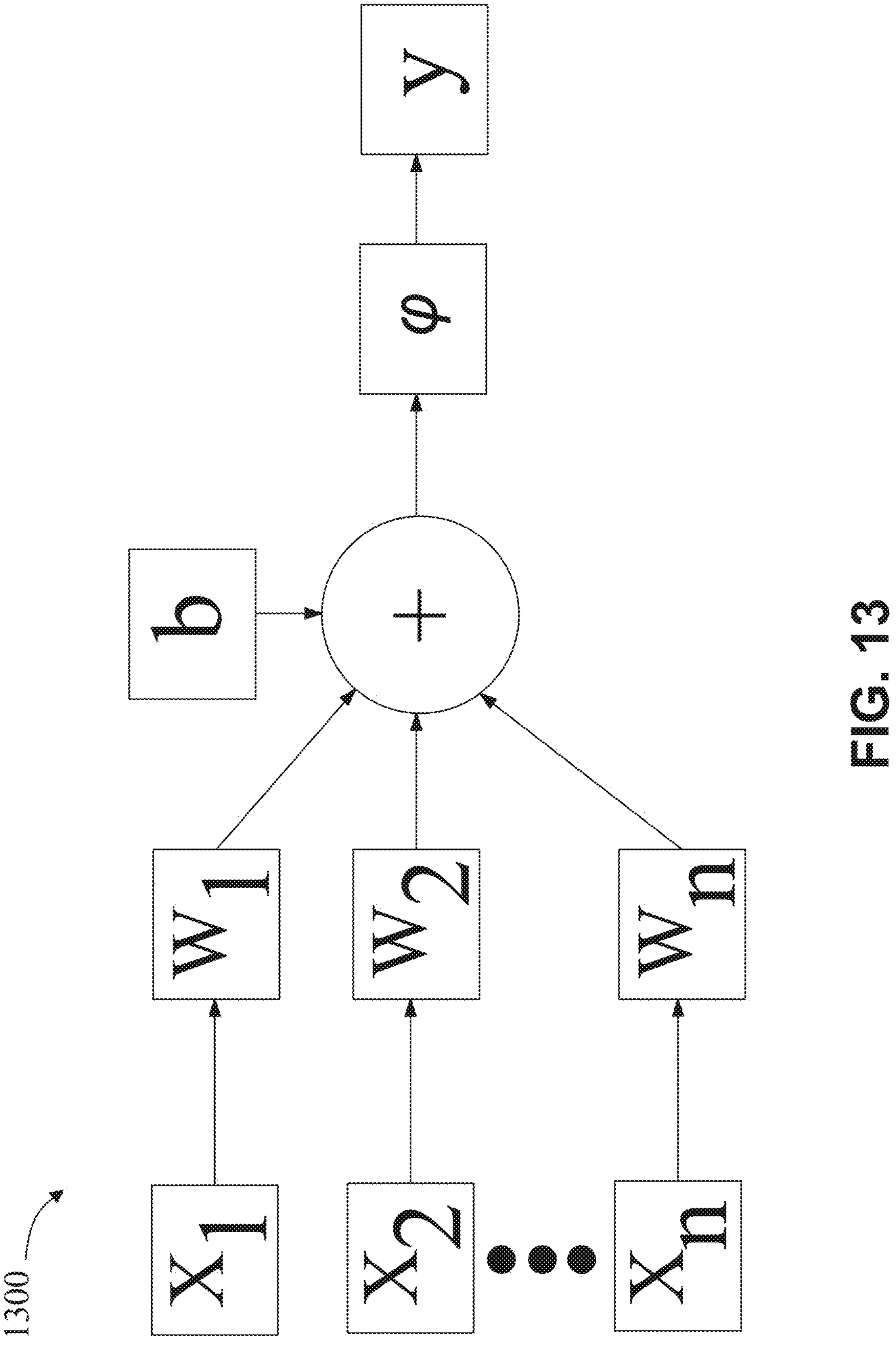
FIG. 13 is a diagram of an exemplary embodiment of a node of a neural network.

Referring now to FIG. 13, an exemplary embodiment of a node 1300 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tan h derivative function such as $f(x)=\tan h^2(x)$, a rectified linear unit function such as $f(x)=\max(0, x)$, a "leaky" and/or "parametric" rectified linear unit function such as $f(x)=\max(\alpha x, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\Sigma_i x_i}$$

where the inputs to an instant layer are $x_i$, a swish function such as f(x)=x*sigmoid(x), a Gaussian error linear unit function such as $f(x)=\alpha(1+\tan h(\sqrt{2/\pi}(x+bx^r)))$ for some values of a, b, and r, and/or a scaled exponential linear unit function such as $$f(x) = \lambda\begin{cases} \alpha(e^x - 1) \text{ for } x < 0 \\ x \text{ for } x \geq 0 \end{cases}.$$

Fundamentally, there is no limit to the nature of functions of inputs xi that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w; may be determined by training a neural network using training data, which may be performed using any suitable process as described above.

Figure 14:
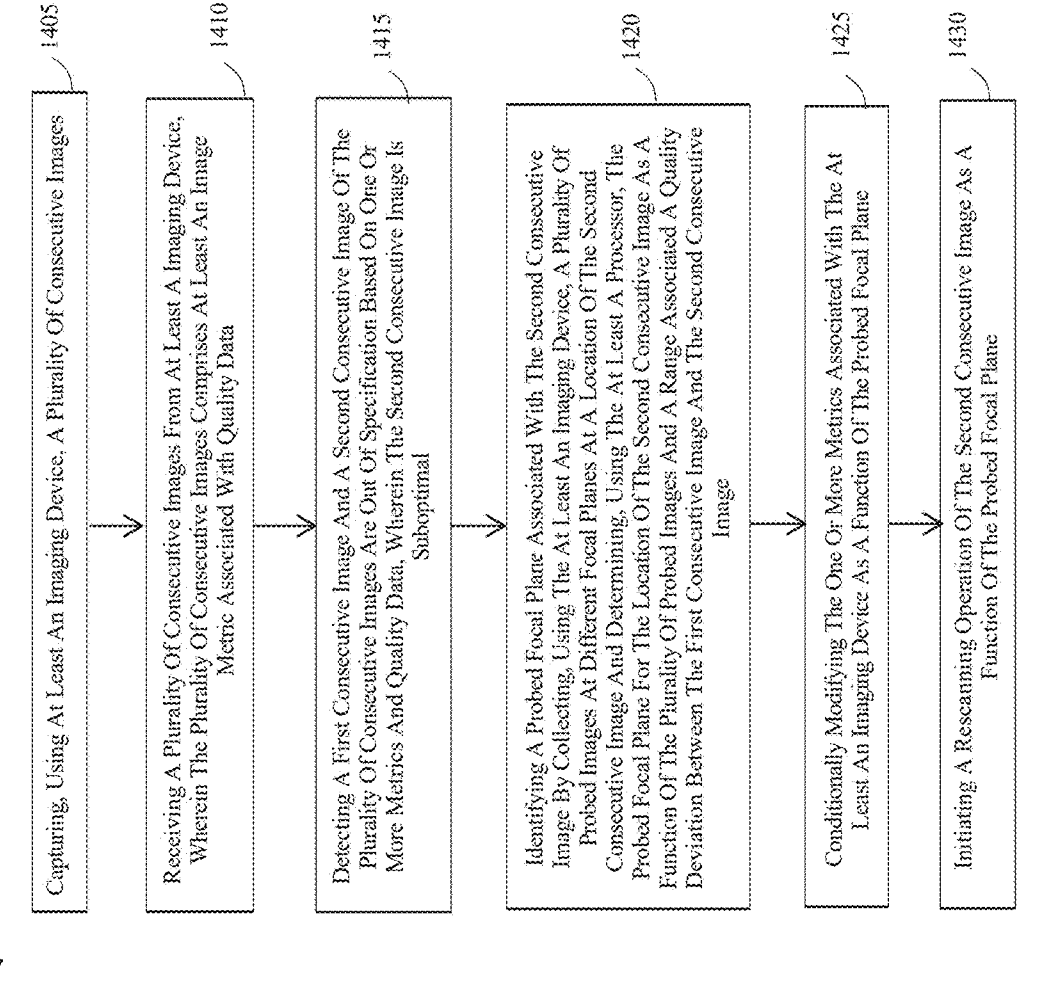
FIG. 14 is a block diagram of an exemplary method for inline detection and modification of suboptimal scan views of a plurality of consecutive images.

Referring now to FIG. 14, a flow diagram of an exemplary method 1400 for inline detection and modification of sub-optimal scan views of a plurality of consecutive images is illustrated. At step 1405, method 1400 includes capturing, using at least an imaging device, a plurality of consecutive images. This may be implemented as described and with reference to FIGS. 1-13.

Still referring to FIG. 14, at step 1410, method 1400 includes receiving, using at least a processor communicatively connected to the at least an imaging device, a plurality of consecutive images from at least an imaging device, wherein the plurality of consecutive images comprises at least an image metric associated with quality data. This may be implemented as described and with reference to FIGS. 1-13.

Still referring to FIG. 14, at step 1415, method 1400 includes detecting, using the at least a processor, a first consecutive image and a second consecutive image of the plurality of consecutive images are out of specification based on one or more metrics and quality data, wherein the second consecutive image is suboptimal. This may be implemented as described and with reference to FIGS. 1-13.

Still referring to FIG. 14, at step 1420, method 1400 includes identifying, using the at least an imaging device, a probed focal plane associated with the second consecutive image by.

collecting, using the at least an imaging device, a plurality of probed images at different focal planes at a location of the second consecutive image and determining, using the at least a processor, the probed focal plane for the location of the second consecutive image as a function of the plurality of probed images and a range associated a quality deviation between the first consecutive image and the second consecutive image. This may be implemented as described and with reference to FIGS. 1-13.

Still referring to FIG. 14, at step 1425, method 1400 includes conditionally modifying, using the at least a processor, the one or more metrics associated with the at least an imaging device as a function of the probed focal plane. This may be implemented as described and with reference to FIGS. 1-13

Still referring to FIG. 14, at step 1430, method 1400 includes initiating, using the at least an imaging device, a rescanning operation of the second consecutive image as a function of the probed focal plane. This may be implemented as described and with reference to FIGS. 1-13.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 15:
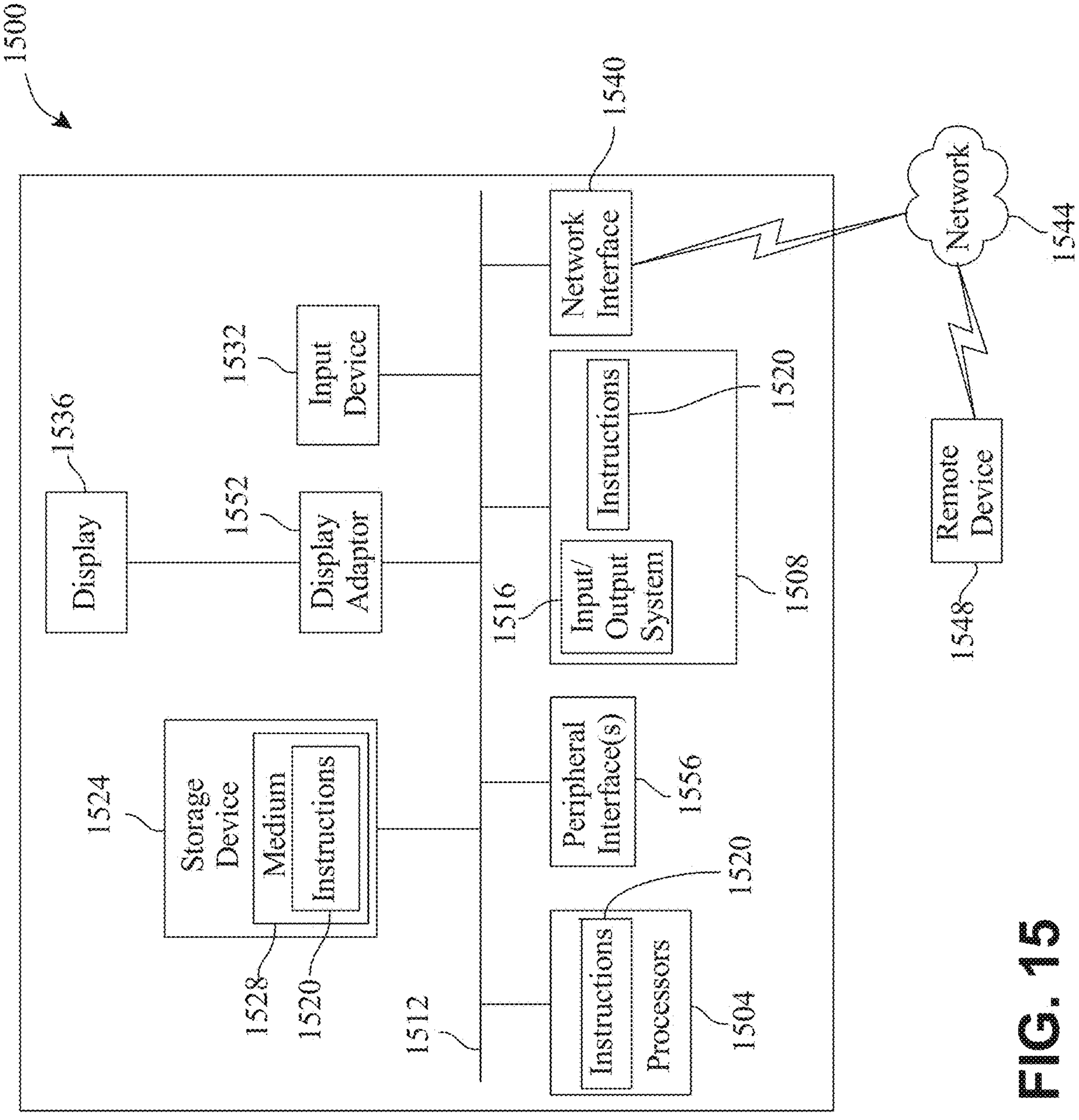
FIG. 15 is a block diagram of a computing system that can be used to implement any one or more of the methodologies disclosed herein and any one or more portions thereof.

FIG. 15 shows a diagrammatic representation of one embodiment of computing device in the exemplary form of a computer system 1500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1500 includes a processor 1504 and a memory 1508 that communicate with each other, and with other components, via a bus 1512. Bus 1512 may include any of several types of bus structures including, but not limited to, a memory bus, a memory controller, a peripheral bus, a local bus, and any combinations thereof, using any of a variety of bus architectures.

Processor 1504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1504 may be organized according to Von Neumann and/or Harvard architecture as a non-limiting example. Processor 1504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1508 may include various components (e.g., machine-readable media) including, but not limited to, a random-access memory component, a read only component, and any combinations thereof. In one example, a basic input/output system 1516 (BIOS), including basic routines that help to transfer information between elements within computer system 1500, such as during start-up, may be stored in memory 1508. Memory 1508 may also include (e.g., stored on one or more machine-readable media) instructions (e.g., software) 1520 embodying any one or more of the aspects and/or methodologies of the present disclosure. In another example, memory 1508 may further include any number of program modules including, but not limited to, an operating system, one or more application programs, other program modules, program data, and any combinations thereof.

Computer system 1500 may also include a storage device 1524. Examples of a storage device (e.g., storage device 1524) include, but are not limited to, a hard disk drive, a magnetic disk drive, an optical disc drive in combination with an optical medium, a solid-state memory device, and any combinations thereof. Storage device 1524 may be connected to bus 1512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1524 (or one or more components thereof) may be removably interfaced with computer system 1500 (e.g., via an external port connector (not shown)). Particularly, storage device 1524 and an associated machine-readable medium 1528 may provide nonvolatile and/or volatile storage of machine-readable instructions, data structures, program modules, and/or other data for computer system 1500. In one example, software 1520 may reside, completely or partially, within machine-readable medium 1528. In another example, software 1520 may reside, completely or partially, within processor 1504.

Computer system 1500 may also include an input device 1532. In one example, a user of computer system 1500 may enter commands and/or other information into computer system 1500 via input device 1532. Examples of an input device 1532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1532 may be interfaced to bus 1512 via any of a variety of interfaces (not shown) including, but not limited to, a serial interface, a parallel interface, a game port, a USB interface, a FIREWIRE interface, a direct interface to bus 1512, and any combinations thereof. Input device 1532 may include a touch screen interface that may be a part of or separate from display device 1536, discussed further below. Input device 1532 may be utilized as a user selection device for selecting one or more graphical representations in a graphical interface as described above.

A user may also input commands and/or other information to computer system 1500 via storage device 1524 (e.g., a removable disk drive, a flash drive, etc.) and/or network interface device 1540. A network interface device, such as network interface device 1540, may be utilized for connecting computer system 1500 to one or more of a variety of networks, such as network 1544, and one or more remote devices 1548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1544, may employ a wired and/or a wireless mode of communication. In general, any network topology may be used. Information (e.g., data, software 1520, etc.) may be communicated to and/or from computer system 1500 via network interface device 1540.

Computer system 1500 may further include a video display adapter 1552 for communicating a displayable image to a display device, such as display device 1536. Examples of a display device include, but are not limited to, a liquid crystal display (LCD), a cathode ray tube (CRT), a plasma display, a light emitting diode (LED) display, and any combinations thereof. Display adapter 1552 and display device 1536 may be utilized in combination with processor 1504 to provide graphical representations of aspects of the present disclosure. In addition to a display device, computer system 1500 may include one or more other peripheral output devices including, but not limited to, an audio speaker, a printer, and any combinations thereof. Such peripheral output devices may be connected to bus 1512 via a peripheral interface 1556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for inline detection and modification of suboptimal scan views of a plurality of consecutive images, wherein the apparatus comprises:

at least an imaging device configured to capture a plurality of consecutive images;

at least a computing device communicatively connected to the at least an imaging device, wherein the computing device comprises:

a non-transitory memory; and at least a processor communicatively connected to the non-transitory memory, wherein the non-transitory memory contains instructions configuring the at least a processor to:

receive, using the at least a processor, the plurality of consecutive images from the at least an imaging device, wherein each consecutive image of the plurality of consecutive images is associated with at least an image metric;

detect, using the at least a processor, a first consecutive image and a second consecutive image of the plurality of consecutive images are out of specification based on one or more metrics and quality data, wherein the second consecutive image is suboptimal;

identify, using the at least an imaging device, a probed focal plane associated with the second consecutive image by:

collecting, using the at least an imaging device, a plurality of probed images at different focal planes at a location of the second consecutive image; and determining, using the at least a processor, the probed focal plane for the location of the second consecutive image as a function of the plurality of probed images;

conditionally modify, using the at least a processor, the one or more metrics associated with the at least an imaging device as a function of the probed focal plane; and initiate, using the at least an imaging device, a rescanning operation of the second consecutive image as a function of the probed focal plane.

2. The apparatus of claim 1, wherein the at least an imaging device comprises a stage, objective, and image sensor, and wherein the at least a processor is further configured to:

communicate with the imaging device to capture the plurality of consecutive images; and receive, from the imaging device, the plurality of consecutive images.

3. The apparatus of claim 1, wherein the at least a processor is further configured to determine the probed focal plane for the location of the second consecutive image as a function of a range associated a quality deviation between the first consecutive image and the second consecutive image.

4. The apparatus of claim 3, wherein the range of the plurality of probed images of the second consecutive image that is suboptimal is associated with at least a sample plane, at least a cover slip plane, and at least a top of coverslip plane.

5. The apparatus of claim 3, wherein the range associated the quality deviation comprises greater than or equal to 60 microns.

6. The apparatus of claim 1, wherein the plurality of consecutive images represent at least a biological sample.

7. The apparatus of claim 1, wherein the at least a processor is further configured to automatically modify a Z-plane position of the one or more metrics associated with the at least an imaging device.

8. The apparatus of claim 1, wherein the at least a processor is further configured to display, using a graphical user interface of a downstream device, a digital representation of a modification of the one or more metrics associated with the at least an imaging device.

9. The apparatus of claim 8, wherein the at least a processor is further configured to receive, using the graphical user interface, feedback associated with the modification of the one or more metrics.

10. The apparatus of claim 1, wherein the at least a processor is further configured to identify, using a Z-probing model, the probed focal plane, wherein the Z-probing model comprises a machine learning model, the machine learning model trained using a training dataset, wherein the training dataset comprises historical consecutive images associated with historical probed focal plane.

11. A method for inline detection and modification of suboptimal scan views of a plurality of consecutive images, wherein the method comprises:

capturing, using at least an imaging device, a plurality of consecutive images;

receiving, using at least a processor communicatively connected to the at least an imaging device, a plurality of consecutive images from at least an imaging device, wherein the plurality of consecutive images comprises at least an image metric associated with quality data;

detecting, using the at least a processor, a first consecutive image and a second consecutive image of the plurality of consecutive images are out of specification based on one or more metrics and quality data, wherein the second consecutive image is suboptimal;

identifying, using the at least an imaging device, a probed focal plane associated with the second consecutive image by:

collecting, using the at least an imaging device, a plurality of probed images at different focal planes at a location of the second consecutive image; and determining, using the at least a processor, the probed focal plane for the location of the second consecutive image as a function of the plurality of probed images and a range associated a quality deviation between the first consecutive image and the second consecutive image;

conditionally modifying, using the at least a processor, the one or more metrics associated with the at least an imaging device as a function of the probed focal plane; and initiating, using the at least an imaging device, a rescanning operation of the second consecutive image as a function of the probed focal plane.

12. The method of claim 11, further comprising a stage, objective, and image sensor of the at least an imaging device, wherein the at least a processor is further configured to:

communicate with the imaging device to capture the plurality of consecutive images; and receive, from the imaging device, the plurality of consecutive images.

13. The method of claim 11, further comprising determining, using the at least a processor, the probed focal plane for the location of the second consecutive image as a function of a range associated a quality deviation between the first consecutive image and the second consecutive image.

14. The method of claim 13, further comprising collecting a range of the plurality of probed images associated with the first consecutive image that is suboptimal, wherein the range is associated with at least a sample plane, a coverslip plane, and a top of coverslip plane.

15. The method of claim 13, further comprising determining a quality deviation between the first consecutive image and the second consecutive image that is suboptimal, wherein the quality deviation comprises a distance greater than or equal to 60 microns.

16. The method of claim 11, further comprising receiving the plurality of consecutive images, wherein the plurality of consecutive images represent at least a biological sample.

17. The method of claim 11, further comprising automatically modifying, using the at least a processor, a Z-plane position of the one or more metrics associated with the at least an imaging device.

18. The method of claim 11, further comprising displaying, using a graphical user interface of a downstream device, a digital representation of a modification of the one or more metrics associated with the at least an imaging device.

19. The method of claim 18, further comprising receiving, using the graphical user interface, feedback associated with the modification of the one or more metrics.

20. The method of claim 11, further comprising identifying, using a Z-probing model, the probed focal plane, wherein the Z-probing model comprises a machine learning model, the machine learning model trained using a training dataset, wherein the training dataset comprises historical consecutive images associated with historical probed focal plane.

* * * * *